US012629808B1

(12) United States Patent
Collette

(10) Patent No.: US 12,629,808 B1
(45) Date of Patent: May 19, 2026

(54) SYSTEM AND METHOD FOR RESTORING AND AESTHETICALLY ENHANCING CONCRETE SURFACES

(71) Applicant: Marc Collette, Jupiter, FL (US)

(72) Inventor: Marc Collette, Jupiter, FL (US)

( * ) Notice: Subject to any disclaimer, the term of this patent is extended or adjusted under 35 U.S.C. 154(b) by 0 days.

(21) Appl. No.: 17/993,813

(22) Filed: Nov. 23, 2022

(51) Int. Cl.
*E01C 11/00* (2006.01)
*B25D 17/02* (2006.01)
*B44C 1/22* (2006.01)
*E01C 15/00* (2006.01)
*E04F 21/00* (2006.01)
*E04G 23/02* (2006.01)
*B44F 9/04* (2006.01)

(52) U.S. Cl.
CPC .............. *B25D 17/02* (2013.01); *B44C 1/222* (2013.01); *B25D 2222/72* (2013.01); *B44F 9/04* (2013.01)

(58) Field of Classification Search
CPC ...... B25D 17/02; B25D 2222/72; B28D 1/30; B44C 1/222; B44F 9/04; E01C 11/005; E01C 23/09
See application file for complete search history.

(56) References Cited

U.S. PATENT DOCUMENTS 991,830 A * 5/1911 Clements ................ E21B 10/36 175/414
1,098,795 A * 6/1914 Gill ......................... E21B 10/36 175/414
1,458,039 A * 6/1923 Eiermann .............. A01B 1/022 37/434
1,532,468 A * 4/1925 Bawden .................. E21B 10/00 175/414
1,570,650 A * 1/1926 Thomson ................. B25D 3/00 30/168
2,280,007 A * 4/1942 Plateck .................... B28D 1/26 30/286

(Continued)

FOREIGN PATENT DOCUMENTS

GB 2207380 A * 2/1989 ............. B25D 17/02
GB 2399312 A * 9/2004 ............. B25D 17/02

OTHER PUBLICATIONS

TR Industrial, "TR Industrial Asphalt Cutter Chisel", Oct. 2, 2022, website: https://trindustrial.com/asphalt-cutter-chisel/ (Year: 2022).*

*Primary Examiner* — Shelley M Self
*Assistant Examiner* — David G Shutty
(74) *Attorney, Agent, or Firm* — Glenn Gold, P.A.; Glenn E. Gold

(57) ABSTRACT

A concrete surface beautification and/or restoration method enables the use, or incorporation, of cracks in the surface of an existing or newly formed concrete slab as part of the beautification/restoration process. Initially, temporary marking lines are imparted in an artistic manner upon an upper surface of the concrete, intentionally extending from ends of, or otherwise intersecting with, the existing cracks and optionally existing concrete surface expansion joints and relief cuts, to subsequently create an aesthetically-pleasing natural random surface pattern, such as a natural stone appearance. Specialized chipping hammer bits may be employed to cut, chip and/or route along both the existing cracks and the temporary marking lines to create an even, generally uniform carved visual appearance (e.g., replicating the look of a natural stone surface).

12 Claims, 21 Drawing Sheets

(56) References Cited

U.S. PATENT DOCUMENTS 2,900,178 A * 8/1959 Harrison ................ E21B 10/36 125/36
3,043,002 A * 7/1962 Brown .................. B25D 17/02 30/168
3,047,082 A * 7/1962 Brown .................. B28D 1/146 D15/21
3,065,580 A * 11/1962 Benjamin ......... B23B 51/00035 451/369
3,171,192 A * 3/1965 Ortner ...................... B22F 7/08 428/564
3,191,909 A * 6/1965 Reischl .................. B23D 79/02 30/168
3,258,295 A * 6/1966 Cyril ..................... E01C 23/124 30/168
3,842,942 A * 10/1974 Jensen ...................... E21B 1/00 175/320
4,083,111 A * 4/1978 Kerins .................... B25B 27/18 30/305
4,089,562 A * 5/1978 Baumeister ............ B25D 17/02 125/36
4,144,868 A * 3/1979 Heitbrink ............... B25D 17/02 125/41
D264,043 S * 4/1982 Edwards .......................... D8/89
4,595,322 A * 6/1986 Clement ........... B23B 51/00035 175/420.1
4,665,673 A * 5/1987 Diana ..................... B28B 1/008 52/316
D331,866 S * 12/1992 Edy ................................. D8/47
5,322,138 A * 6/1994 Siracki .................... E21B 10/56 175/426
5,632,527 A * 5/1997 Halder .................. E02F 9/2808 299/101
6,257,673 B1 * 7/2001 Markham .............. B25D 17/02 299/37.3
6,981,496 B2 * 1/2006 Szendrovari ........... B25D 17/02 125/41
7,179,018 B2 * 2/2007 Hall ........................ E01C 23/06 404/90
D637,629 S * 5/2011 Clark ............................. D15/21
D642,204 S * 7/2011 Clark ............................. D15/21
D648,356 S * 11/2011 Clark ............................. D15/29
8,769,827 B2 * 7/2014 Powers .................... B25D 3/00 30/167
D756,741 S * 5/2016 Redondi .......................... D8/70
10,240,306 B2 * 3/2019 Lorenz .................... B24B 7/186
10,246,837 B2 * 4/2019 Lorenz ................ E01C 23/0933
D922,842 S * 6/2021 Hyma .............................. D8/47
11,326,310 B2 * 5/2022 Velazquez ............... E01C 15/00
11,673,246 B2 * 6/2023 Gerold ..................... B25D 3/00 125/41
2003/0221685 A1 * 12/2003 Lang ...................... B25D 17/02 125/41
2006/0022511 A1 * 2/2006 Rompel ................. B25D 17/02 299/100
2021/0180272 A1 * 6/2021 Velazquez ............. E01C 23/094
2022/0040840 A1 * 2/2022 Clark ....................... B25G 3/30

* cited by examiner

SYSTEM AND METHOD FOR RESTORING AND AESTHETICALLY ENHANCING CONCRETE SURFACES

FIELD OF THE INVENTION

The present invention relates generally to the restoration and aesthetic enhancement of new and old concrete surfaces.

BACKGROUND OF THE INVENTION

Various conventional methods are known for aesthetically enhancing and/or restoring concrete surfaces, such as driveway surfaces, patio surfaces, walkways, and the like. Sometimes, consumers are merely interested in simply beautifying a plain, bare concrete surface in order to make it more aesthetically pleasing. Oftentimes, however, this interest is prompted by the appearance of unsightly cracks, joints, chips, and related imperfections in the concrete surface. Unfortunately, many of the most common conventional concrete surface beautification methods (e.g., overlaying tiles, pavers and stones, coating, stamping, etc.) are very expensive and, therefore, cost-prohibitive for homeowners and business owners. Less expensive surface treatment options (e.g., staining, painting, etc.) do not contribute much in terms of aesthetics to the original surface, and such coatings are highly susceptible to fading from the elements, damage from foot traffic, peeling and flaking off, etc. Significantly, these less expensive surface treatments are not even an option where the surface includes cracks and other imperfections, which remain visible following such treatment. Furthermore, new cracks that form when concrete expands, and settles are very difficult to disguise.

Concrete cracking in poured concrete slabs is very common in the construction industry. In fact, one of the most common consumer complaints lodged by home and business owners relates to cracks developing in newly poured concrete.

One common cause for concrete cracking is the addition of excess water in the concrete mix prior to pouring. Concrete does not require much water to achieve maximum strength. But a vast majority of concrete used in residential work has too much water added to the concrete on the job site. The addition of water to concrete facilitates pouring and installation of the concrete mix. However, excess water also greatly reduces the strength of the concrete once it sets. Concrete shrinkage is a primary cause of cracking. As concrete hardens and dries, or sets, its volume shrinks. This shrinkage, or contraction, is due to the evaporation of excess mixing water. The wetter or soupier the concrete mix, the greater the shrinkage will be. Concrete slabs can shrink as much as one-half inch per 100 feet. This shrinkage creates forces in the concrete that literally pull the slab apart. Cracks are the end result of these forces. Other common causes of concrete cracking include rapid drying of the concrete, improper strength of concrete poured on the job, lack of control joints, settling of the underlying soil substrate, and pouring concrete on frozen ground.

Cracks are one of the most common problems in indoor and outdoor concrete slabs, such as, for example, basement floors, driveways, walkways, garage floors, patios, pool decks and parking areas. If a crack is not properly repaired in a timely manner, the situation will often worsen; resulting in spalling, or delamination, and/or disintegration of the concrete. There are a host of known methods for repairing cracks in concrete slabs. However, short of completely re-pouring a brand-new concrete slab, which is damaging to the environment and often cost prohibitive, conventional known concrete crack repairing methods leave a less-than-desirable appearance. Furthermore, there are no known methods for repairing cracks such that the repaired crack is not visible following the repair. Moreover, no conventional crack repair methods will prevent the "repaired" concrete from cracking again in the same location.

One known method involves the use of self-leveling polyurethane caulk, wherein the crack is covered with caulk. This method is inexpensive and easy to perform; however, it only provides a short-term structural fix, and does not provide an aesthetically pleasing solution. Water wicking through the concrete or trapped water vapor will weaken the polyurethane bond to the underlying concrete, which may show up as efflorescence; the appearance of white salt deposits on or near the surface of concrete causing a change in appearance. Degradation of the polyurethane caulk is further accelerated by foot traffic and the like. In a relatively short period of time, the caulk loosens and peels off.

Another known concrete crack repair method comprises the use of hydraulic cement which, again, is only a temporary fix. Hydraulic cement is waterproof, but it does not bond well to concrete. In order to compensate for poor bonding, this method generally requires initially chiseling out the concrete crack to form an inverted V-groove to maintain the hydraulic cement in place. However, hydraulic cement is more rigid than concrete. Consequently, as the concrete is displaced from naturally occurring expansion and contraction, it loosens the stiff hydraulic cement. In very little time, water seepage, efflorescence, etc. will appear around the edges of the hydraulic cement plug, as well as around the crack itself. Accordingly, this common method of repairing concrete cracks (i.e., using a filler to fill the crack, or using a material such as caulk to cover the crack) provides only a temporary fix that is not aesthetically pleasing.

Accordingly, there has been a long-felt, yet unmet, need in the concrete surface restoration and beautification industry for a means of beautifying and restoring concrete surfaces, which overcomes at least the aforementioned drawbacks, limitations and disadvantages of conventional concrete surface restoration processes.

In that regard, it would be highly desirable to provide an inexpensive method of restoring and/or beautifying concrete surfaces without requiring pouring new concrete, which provides an aesthetically pleasing surface riveling that of more expensive methods, but without the high cost. Preferably, such a process would also be highly efficient such that the beautification and/or restoration of most conventional concrete surfaces (e.g., driveways, patios, walkways, etc.) could be completed within a single 24-hour period of time.

It would be very desirable to provide such a method which is uniquely adaptable for use on concrete surfaces having existing unsightly cracks, relief and expansion joints, and/or other surface imperfections and damage. In that regard, it would be highly beneficial to provide such a method particularly well adapted to actually incorporate the aforementioned cracks, joints, surface imperfections, etc. directly into a newly created concrete surface design. Furthermore, it would be beneficial to incorporate cracks that also function as expansion joints.

SUMMARY OF THE INVENTION

Generally, the present invention provides a system and method that can be employed to both restore an existing concrete surface having unsightly cracks, joints and/or other imperfections, and to beautify an existing concrete surface absent such unsightly cracks, joints and/or imperfections.

With regard to restoration, the method provides a means of incorporating unsightly surface cracks, joints and/or other imperfections—and, optionally, expansion joints and relief cuts—in an unconventional manner, to ultimately create an aesthetically pleasing natural stone look, or any desired aesthetically pleasing, durable, surface appearance. By way of example, the method may be employed to create a concrete surface having an appearance accurately resembling a natural flagstone surface, fieldstone surface, slate surface, and the like. Significantly, the inventive process enables the restoration of distressed concrete, which otherwise would have to be replaced.

With regard to concrete surface restoration, a concrete slab disposed upon a subsurface may be provided, wherein the concrete surface has one or more unsightly cracks, joints and/or other surface imperfections visible upon an upper surface of the concrete slab. As used herein, the term "joint" is not meant to be limiting. For example, it may be used to denote a control joint, expansion joint, relief cut or any other intentionally created separation. Optionally, the concrete surface may be initially cleaned using a pressure washing apparatus or the like in order to remove surface staining and debris, as well as loose sediment and other debris from within the cracks.

A series of temporary artistic marking lines may be initially drawn, or otherwise disposed upon, the concrete surface to form a temporary pattern outline for creating the final desired surface appearance. Significantly, the temporary pattern outline is disposed upon the concrete surface such that the existing cracks are directly integrated with the marking lines to form a complete, contiguous outline pattern comprised of a series of interconnected marking line segments, crack segments, joint segments, and/or surface imperfections. Preferably, the contiguous outline pattern forms the basis for the final desired surface pattern (e.g., natural fieldstone pattern, flagstone pattern, slate pattern, etc.).

Once the concrete surface has been marked to form the contiguous outline pattern, a chipping hammer, alternatively referred to in the construction industry as a demolition hammer, may be used to cut, carve, engrave, chisel and/or hammer chip the existing cracks and the marking lines adjoining individual crack lengths with a series of unique, unconventional chipping hammer bits particularly designed by the present inventor for implementing the inventive method. Various combinations of the unique chipping hammer bits may be employed depending upon the particular type of concrete being worked on (e.g., hard concrete, soft concrete, etc.) and the types of designed cuts required to create the desired final surface finish or look.

Significantly, the method of the present invention utilizes a conventional chipping hammer in an unconventional manner. That is, chipping hammers are conventionally used with standard chipping hammer bits to break up, or demolish, concrete. However, utilizing specialized chipping hammer bits designed by the present inventor, a conventional chipping hammer is used to impart an aesthetically-pleasing design without breaking up, or otherwise damaging, the surrounding concrete. The unique chipping hammer bits of the present invention may be used for so-called "crack chasing," to effectively create a rough, natural look. As is well known to those skilled in the concrete construction arts, crack chasing is the process of cutting into cracks in concrete so that they can be waterproofed with a sealant or repaired with an epoxy or other filling compound.

Crack chasing is conventionally accomplished using circular diamond blade saws and the like. However, prior to the present invention, there were no known chipping hammer bits capable of being used with a chipping hammer in order to perform such a crack chasing function. Furthermore, conventional crack chasing blades, such as those conventionally used with a circular diamond blade saw, leave behind a straight, unnatural look. Moreover, circular diamond blade saws and the like are not designed to impart sharp corners or angles in concrete. In fact, it is virtually impossible to use a diamond bladed circular saw to impart non-linear cuts into the existing concrete surface without cutting too deep into the concrete.

So, existing crack chasing blades are completely ineffective for imparting a rough, natural look between discrete concrete surface areas separated by the blade cuts. For example, the chipping hammer bits of the present invention may be utilized to impart a user-defined, non-linear natural look mimicking grout lines between natural stone surfaces. Accordingly, the present invention enables the use of a chipping hammer in order to mimic the appearance of a natural stone surface.

Finally, a high-pressure gas/air emitting device, a high-pressure liquid-emitting device (e.g., a conventional pressure washer), or other surface debris cleaning device may be employed for removing undesirable debris left within cracks, cut lines and on the concrete upper surface, as well as for removing any other undesirable concrete surface residues. In addition to clearing undesirable debris, removal of concrete surface residues may function to effectively enhance the ability of the upper surface to bond with subsequently applied stains, colorings, sealants and any other post-cleaning surface treatment.

Where the present method is being employed upon a concrete surface absent any unsightly cracks or imperfections that require camouflaging (e.g., where the concrete surface is part of a newly poured concrete slab), the same process described above (i.e., with respect to restoring a concrete surface with such cracks and/or imperfections) may be employed. However, in the instant scenario the aforementioned temporary marking lines may be drawn to form a temporary pattern outline without integrating any crack segments, etc. therein. Again, in this instance, the contiguous outline pattern forms the basis for the final desired surface pattern required to create the final desired surface look.

In accordance with a significant aspect, where the inventive method is employed using a newly-poured concrete slab, the newly-poured slab may be poured and cured without subsequently creating any relief cuts. Instead, the newly-poured slab may be allowed to naturally crack at its weakest points (i.e., creating natural relief joints), and then those naturally-occurring cracks may be incorporated into to the final design.

Significantly, with the present method, the concrete slab may be extended by cutting or breaking a linear perimeter edge of the slab and pouring additional concrete while extending the concrete surface pattern so that the design imparted upon the existing slab and the design imparted on the surface of the additional concrete area are contiguous (i.e., such that there are no visible seams or other demarcations between the original and new areas). Similarly, areas of an existing concrete slab may be excised (e.g., to provide access to utilities beneath the slab) and subsequently repaired such that there is no obvious visible demarcation between the repaired area and the remainder of the concrete slab surface.

In accordance with a significant aspect, in at least some implementations the inventive method incorporates the use of unconventional, specialized chipping hammer bits that perform unique concrete surface modification functions.

In accordance with another aspect, the present method can be applied to a concrete slab having existing cracks, joints and/or imperfections, as well as to a newly-poured concrete slab—or an existing concrete slab—absent any existing cracks, joints and/or imperfections.

In another aspect, when new cracks occur in a concrete surface previously created via the present method, those new cracks can be easily and effectively incorporated into the concrete surface design (i.e., using the present method).

In another aspect, the method can incorporate the use of tools to carve into concrete in a completely hardened state, as well as into a wet or new concrete composition. Accordingly, the concrete can be carved and/or shaped during any state of drying, from the point at which the concrete is in an initially poured wet state, during its set-up state, through and including the point at which the concrete is in its fully hardened, cured state.

In another aspect, some of the chipping hammer bits may be particularly designed to perform concrete surface modifications along one or more of the crack segments, while other chipping hammer bits may be particularly designed to perform concrete surface modifications upon undamaged areas of the concrete surface (i.e., upon areas that do not contain any cracks, joints or other surface imperfections).

In another aspect, at least some of the chipping hammer bits may be designed to impart a variety of specific mortar joint impressions, or cuts, in the concrete surface, wherein the imparted mortar joint impressions closely resemble, or mimic, actual mortar joints found between natural stones (e.g., flagstone, fieldstones, etc.) occurring in natural stone surfaces.

In another aspect, at least some of the specialized chipping hammer bits may be designed to travel along an existing crack segment in the concrete surface in order to structurally alter or otherwise modify an upper depth of the crack segment.

In another aspect, at least some of the specialized chipping hammer bits may be designed in a manner enabling an operator of the chipping hammer to vary, or alter, the effect of the chipping hammer bit blades on the concrete surface by controllably altering the angle of the blades—vertically and/or laterally—with respect to the concrete surface, and by controllably altering the downward force exerted by the chipping hammer bit blades upon the concrete surface.

In another aspect, the method may incorporate a step of excising or otherwise removing a volume of concrete to create a cavity within an area of the exposed concrete surface, and subsequently inserting, depositing or otherwise disposing a decorative inlay into the created cavity. Preferably, the inlay has a perimeter conforming to the perimeter of the cavity but marginally smaller to facilitate insertion of the inlay into the cavity. Additionally, a mortar joint may be incorporated into a gap between a perimeter edge of the inlay and the perimeter of the cavity.

In another aspect, the method can incorporate a step of painting or staining the concrete surface for the purpose of creating an art faux stone finish, faux painting finish, faux wood finish, or any other desired faux finish or appearance. Likewise, the method can incorporate the deposition of a filler material within gaps defined by the cracks and cuts including, for example, grass, concrete, stones, sand and polymeric materials, and any other desirable materials.

In another aspect, the method can incorporate a step of intentionally adding cracks to the concrete slab for aesthetic and/or utilitarian purposes. For example, such cracks may provide an uneven look or a crackled look, or a gap for subsequent insertion of an aesthetically pleasing filler material. Moreover, intentionally creating a crack and/or spreading an existing crack open may have multiple beneficial functions, including, but not limited to, relieving stress/pressure in the concrete to reduce the likelihood of subsequent cracking. In other words, intentionally created cracks may be imparted into a final design to function as contraction/control joints, expansion joints, construction joints, and/or isolation joints.

In another aspect, functional relief joints, etc. may be incorporated directly incorporated into the pattern/design so that they are camouflaged (i.e., as opposed to relief joints, etc. in conventional concrete surfaces, which are typically unsightly straight-line cuts that stand out like a sore thumb.

In another aspect, intentionally added cuts, cracks, etc. may be commenced from a perimeter edge of a concrete work surface, wherein the bits create a channel through which water on the concrete surface may flow away from the surface toward a surrounding landscape (i.e., precluding the formation of puddles upon the concrete surface). Moreover, by initiating a cut from the perimeter edge of the concrete work surface, the resulting cut functions to relieve stress in the concrete; thereby, precluding the need to create conventional relief cuts in a concrete slab.

In another aspect, the method may integrate existing surface stains into the creation of a newly created artistic surface feature, rather than removing the existing stains. For instance, where a surface to be restored has existing water staining, heavy metal staining, oil stains, foliage and organic material stains, and the like, the method may include incorporating such stains into a final desired aesthetically pleasing artistic surface.

In another aspect, the method may be employed to damaged concrete surfaces where areas of the concrete surface have to be completely repaired (e.g., due to lifting or settling of the concrete) such that the repaired area is incorporated within the design and, therefore, is not noticeable.

In another aspect, by carving existing cracks (i.e., widening the crack openings) the present method helps to prevent additional spalling, etc. to the concrete surface adjacent to the cracked area.

In another aspect, the method may integrate existing impurities in the finish of the concrete into a final desired aesthetically pleasing artistic surface.

In another aspect, the method is easily adaptable for use with a planar surface having any orientation, including horizontal, vertical and angled/sloped planar surfaces, including overhead surfaces.

In another aspect, the present method is adaptable for use restoring three-dimensional concrete forms, using any combination of steps, or any combination of sub-steps, described herein with respect to restoration of concrete slabs, including, but not limited to, modification of existing cracks in the surface of the three-dimensional concrete form and creation and subsequent modification of such cracks in an existing three-dimensional concrete form or during initial creation of a three-dimensional form. This may include, for example, creation of artistically drawn temporary marking lines, some of which may at least partially intersect one or more points along an existing crack, excising material (e.g., by carving, cutting, chipping, and/or etching) along existing cracks and/or along the temporary marking lines, removal of crack and/or exterior surface debris, and subsequent application of any surface treatment, crack filling and the like. Furthermore, the formation of planar or non-planar inlays into the surface of a three-dimensional form may be created in similar fashion to the creation of inlays as described with respect to restoration of conventional concrete slab structures.

In another aspect, the present method provides an environmentally friendly process for beautifying and/or restoring an existing concrete surface without requiring the environmentally unfriendly removal of an existing concrete slab, and subsequently pouring a completely new concrete slab. Moreover, the present method does not require the harvesting of natural products (e.g., wood and stone) from the environment. Many natural products, such as wood and stone, are finite resources that result in damage to the environment and to landscapes during acquisition and raw materials processing. Modifying an existing concrete structure to create a look closely resembling that of a natural wood finish, natural stone finish, etc. provides a much greener alternative.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 14A:
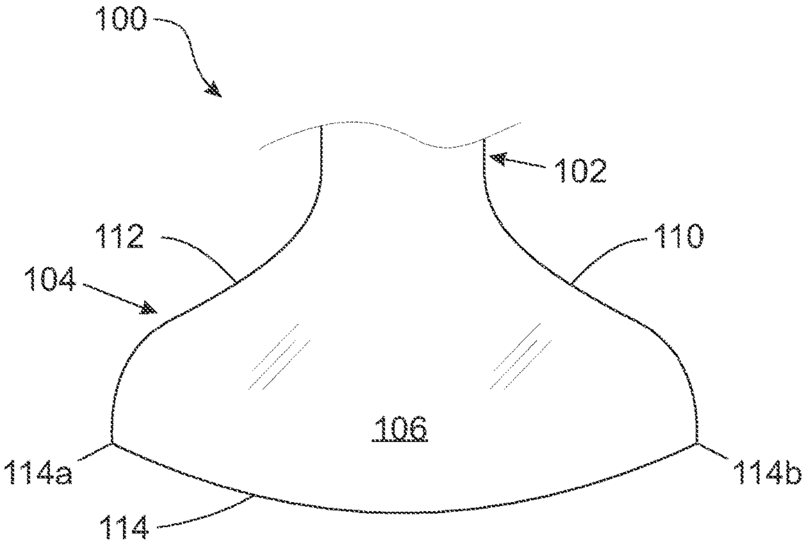
FIGS. 14*a*-14*d* present respective front, bottom, right side, and left side views of a convex, symmetric mortar joint impression chipping hammer bit used in accordance with the method of the present invention.
Figure 14B:
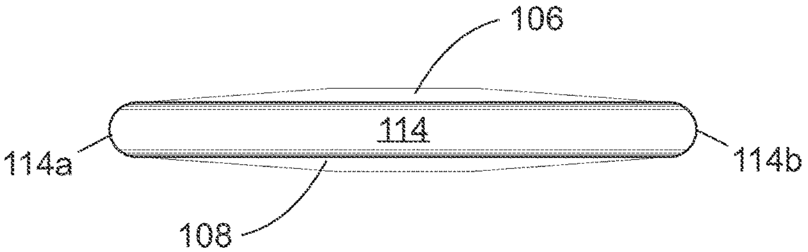
Figure 14D:
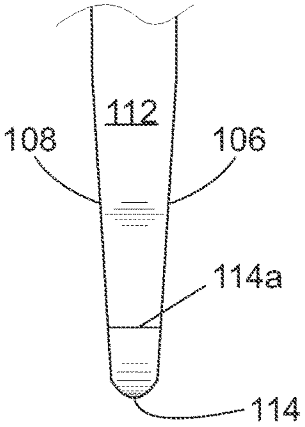
Figure 14C:
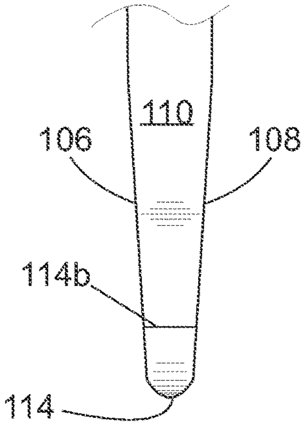
Figure 15A:
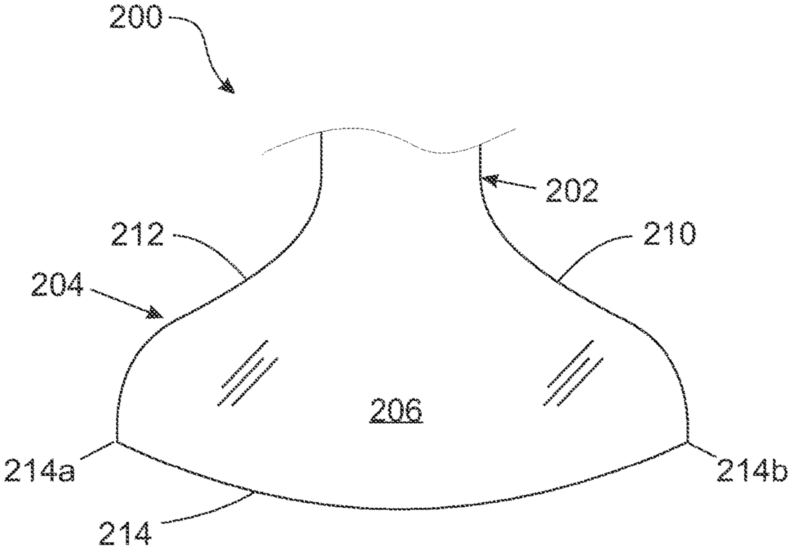
FIGS. 15*a*-15*d* present respective front, bottom, right side, and left side views of a convex, mortar joint impression chipping hammer bit having a tapered blade thickness for enabling a chipping hammer operator to controllably vary the respective width of a mortar joint impression being imparted upon the concrete surface.
Figure 15B:
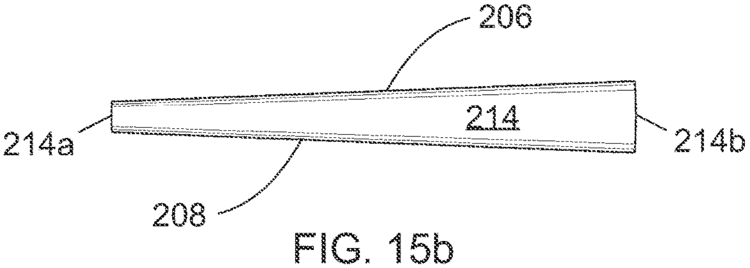
Figure 15D:
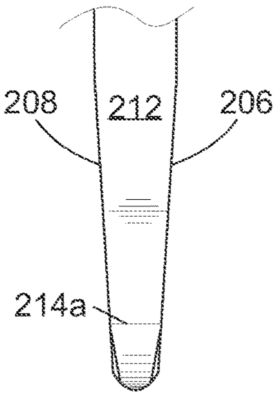
Figure 15C:
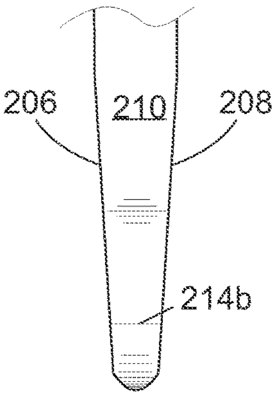
Figure 16A:
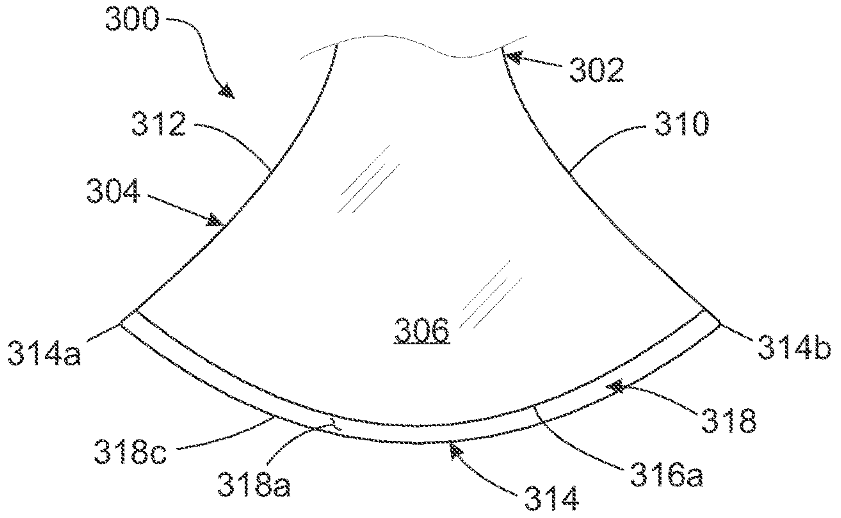
FIGS. 16*a*-16*d* present respective front, bottom, right side, and left side views of a convex, blunt nose mortar joint impression chipping hammer bit having a raised, straight-edged (uniform width) impression portion extending outwardly from the bottom surface of the bit blade.
Figure 16B:
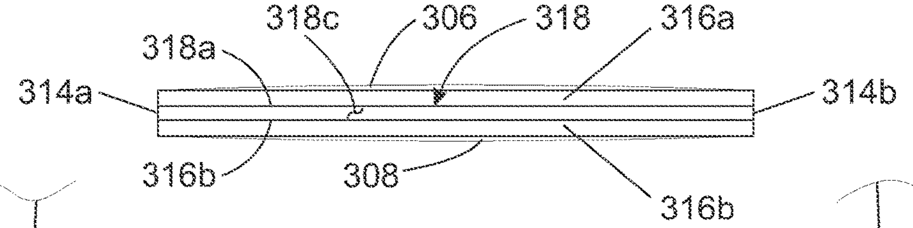

With regard to the chipping hammer bits presented in FIGS. 14*a*-24*f*, for purposes of description herein, the terms "upper", "lower", "left", "rear", "right", "front", "vertical", "horizontal", and derivatives thereof shall relate to the invention as oriented in the first presented view (e.g., FIG. 14*a*, 15*a*, 16*a*, etc.).

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In at least some implementations, a system and method are provided for imparting an aesthetically-pleasing, faux, natural stone appearance on an exposed concrete surface. Significantly, the method may be employed to restore existing surfaces of concrete structures (e.g., driveways, patios, walkways, etc.) by imparting an aesthetically-pleasing design (e.g., a natural stone appearance, a natural wood appearance, etc.) on an exposed concrete surface having unsightly concrete surface cracks, joints, imperfections and the like, wherein the method enables incorporation of such unsightly surface features into the creation, or formation, of the desired post-process surface design.

Although the specification and drawings generally describe implementations of the invention as it relates to conventional planar, horizontally-oriented concrete flooring surfaces, the method may also be implemented to beautify and/or restore non-horizontally oriented surfaces (e.g., walls and ceilings). Likewise, the method may be implemented to create aesthetically-pleasing three-dimensional concrete forms, including, but not limited to sculptures, waterfall features, and the like.

Referring briefly to FIGS. 1-4, a conventional concrete slab structure with which the method of the present invention may be implemented, shown generally as reference numeral 10, may include a concrete slab layer 12 disposed upon an upper surface 14*a* of a subsurface layer, or sub-layer 14. Conventional poured concrete structures, such as concrete-poured patios, driveways, walkways and the like, will often include control joints 18 (e.g., stress relief joints) extending only partially through the concrete slab layer 12, and/or expansion joints 20 extending completely through the concrete slab layer. Contraction joints (alternatively referred to as "control joints") are used in unreinforced and lightly reinforced concrete slabs to minimize random cracking. By creating straight-line weakened planes in concrete, contraction joints "control" the cracking location by inducing cracks at predetermined locations. Similarly, expansion joints permit concrete to expand and contract without causing damage, and also allow it to move freely and independently of other portions of the concrete slab structure. Significantly, utilizing the novel method of the present invention, concrete slabs and other poured concrete structure can be constructed without having to incorporate such conventional joints, which are often undesirable, unsightly and add to the time and cost of construction.

Figure 1:
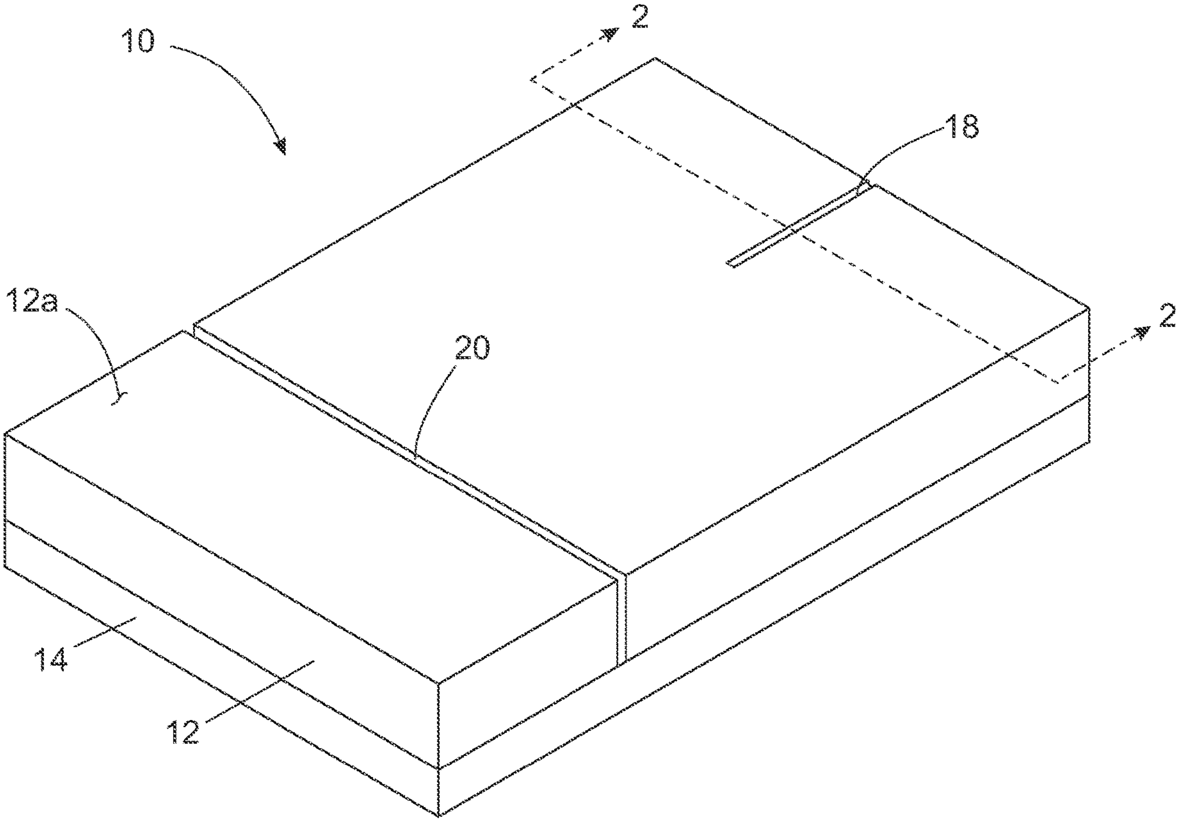
FIG. 1 presents a top isometric view of a concrete slab formed atop a subbase, illustrating vertical and horizontal stress relief cuts extending partially through the slab.
Figure 2:
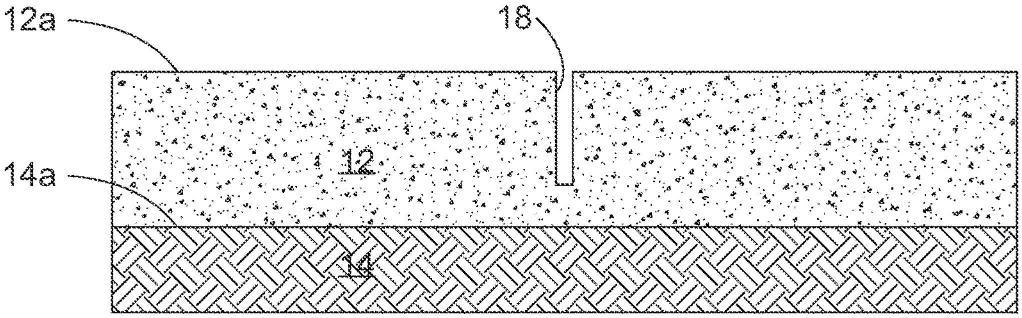
FIG. 2 presents a cross-sectional view taken along section line 2-2 of FIG. 1.
Figure 3:
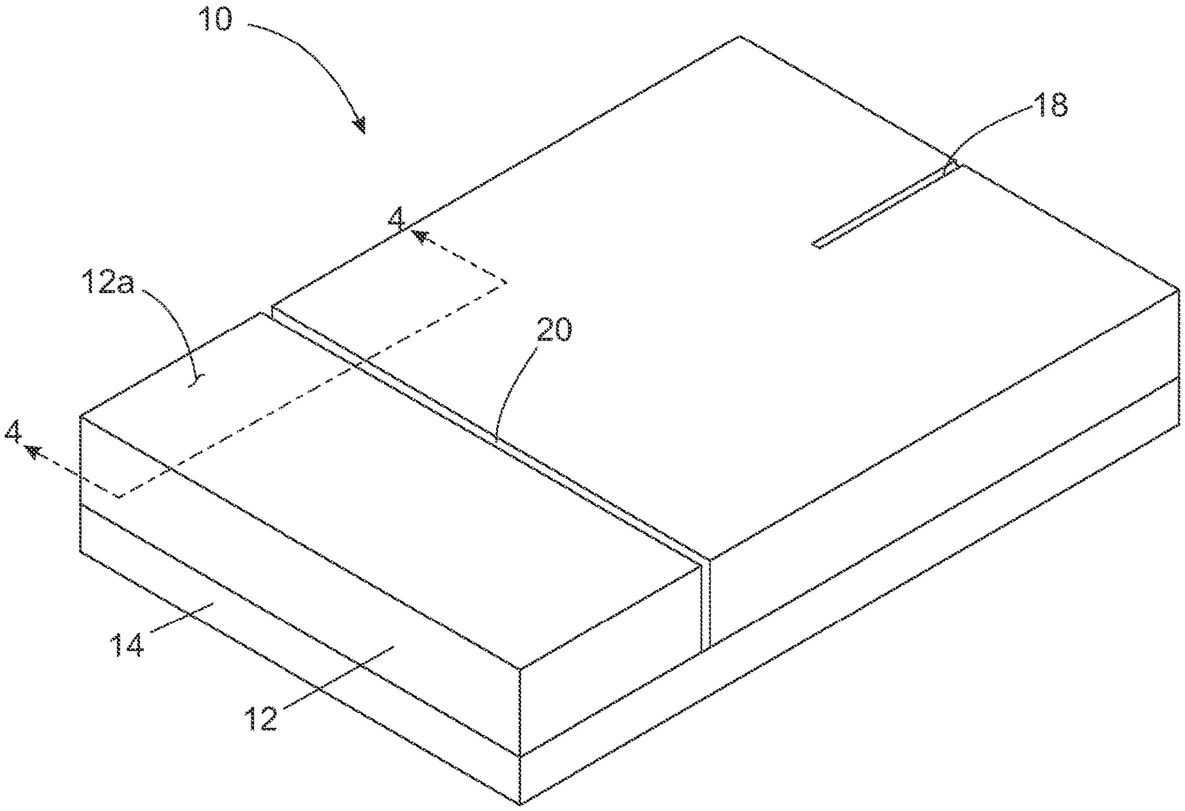
FIG. 3 presents a top isometric view of a concrete slab formed atop a subbase, illustrating vertical and horizontal stress relief cuts extending completely through the slab to the underlying subbase.
Figure 4:
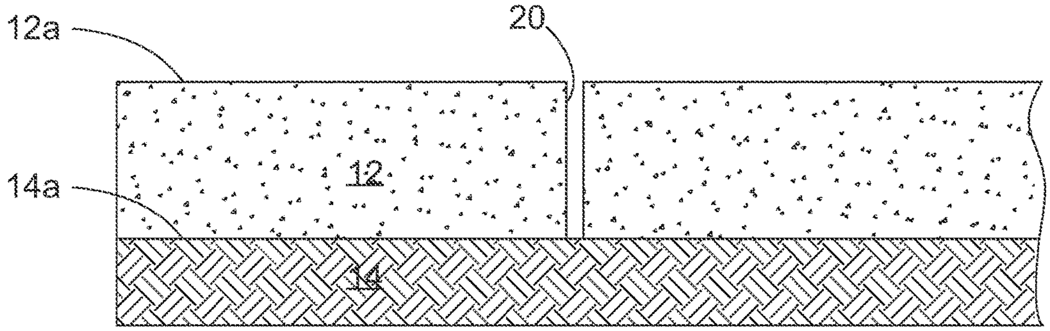
FIG. 4 presents a cross-sectional view taken along section line 4-4 of FIG. 3.
Figure 5:
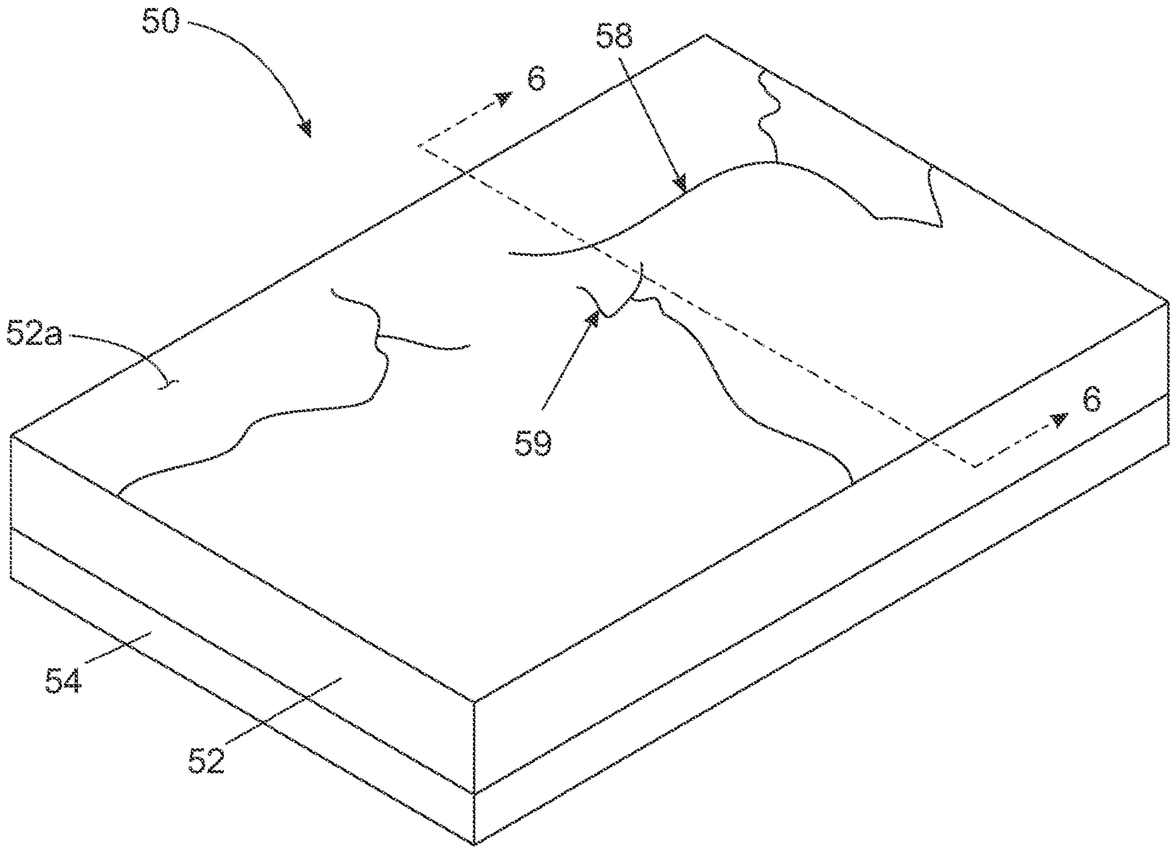
FIG. 5 presents a top isometric view of a concrete slab formed atop a subbase, wherein the upper surface of the concrete slab has naturally formed undesirable cracks extending therethrough, before undergoing the concrete restoration process of the present invention.
Figure 6:
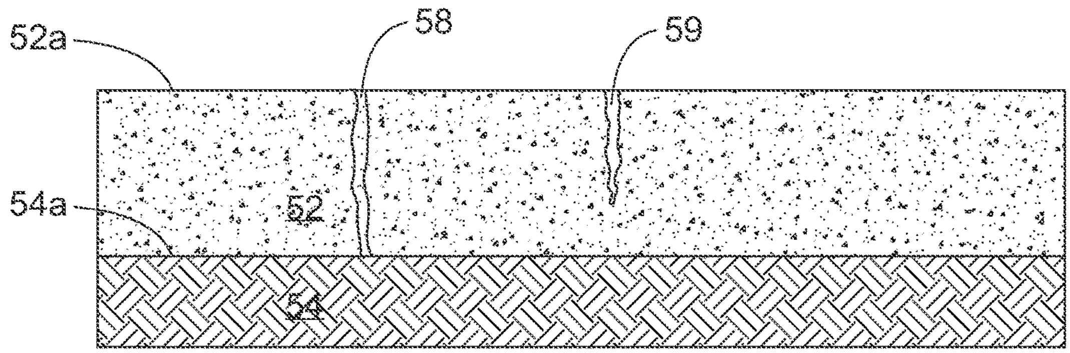
FIG. 6 presents a cross-sectional view taken along section lines 6-6 of FIG. 5.

Referring now to FIGS. 5 and 6, a portion of a poured concrete slab, shown generally as reference numeral 50 (e.g., a conventional concrete slab layer 52 disposed upon an upper surface 54*a* of an underlying sub-layer 54) may develop unsightly cracks 58, 59 extending into the upper surface 52*a* of the concrete slab 52 over time. While the following description describes the process of the present invention as it pertains to restoration of surfaces having undesirable cracks, alternatively, such cracks may be intentionally created during construction of the slab. Some cracks, such as that designated by reference numeral 58, may extend completely through the concrete layer 52 to the upper surface 54*a* of an underlying sub-layer 54. Other cracks, such as that designated by reference numeral 59, may extend only partially through the upper surface 52*a* of concrete layer 52, terminating short of the upper surface 54*a* of the underlying sub-layer 54.

Figure 7:
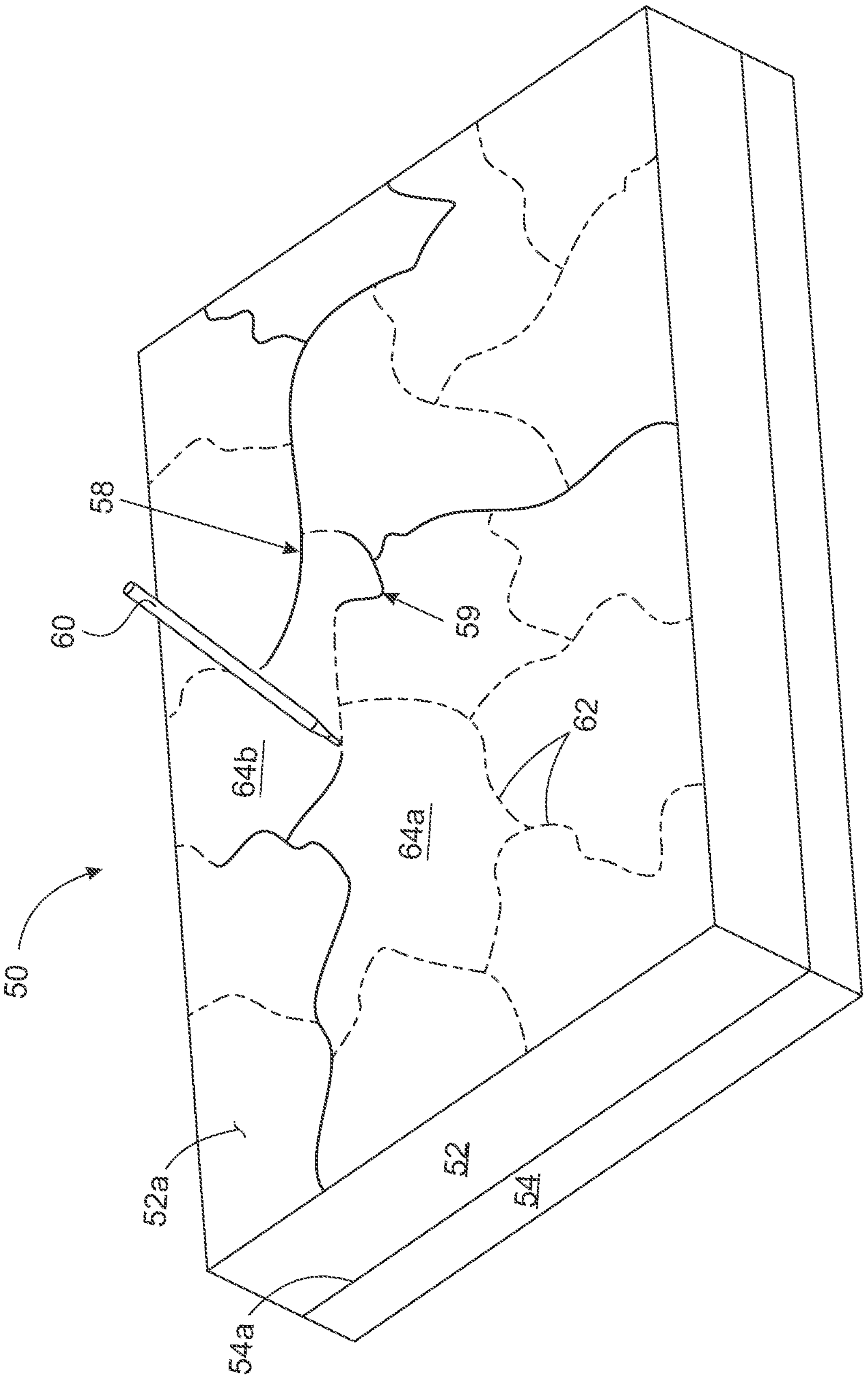
FIG. 7 presents a top isometric view of the concrete slab of FIG. 5, following the step of drawing artistically marked chalk lines extending from the existing cracks to create an aesthetically pleasing upper surface pattern, wherein the cracks have the appearance of forming part of the desired surface pattern design.

Referring now primarily to FIG. 7, a marking device 60, such as a chalk stick, may be used to artistically dispose a series of temporary marking lines 62 upon the upper surface 52*a* of concrete slab layer 52 to form a temporary pattern outline for creating the final desired surface appearance. In implementations of the present method wherein the concrete upper surface 52*a* is absent any cracks or other aesthetically-displeasing surface imperfections, the temporary pattern outline may not have any such unsightly surface features integrated therein. Significantly, in other implementations, the temporary pattern outline may be disposed upon the concrete surface in such a manner that existing cracks and other unsightly concrete surface features are directly integrated with marking lines to form a complete, contiguous outline pattern comprised of a series of interconnected marking line segments, crack segments, joint segments, and/or surface imperfections.

Although a chalk stick is denoted as an exemplary marking device, those skilled in the art will understand that any manual or automated means for creating a desired temporary pattern outline on concrete upper surface 52*a* could be used. Moreover, the temporary pattern outline could comprise a non-physical (e.g., projected light image) overlying the area of the concrete surface being treated. The marking lines 62 may extend from ends of existing cracks 58, 59 and/or intersect points along the lengths of such existing cracks. Such marking lines may also extend from and/or intersect existing concrete joints or other surface features (not shown). Significantly, the temporary marking artistically defines a series of contiguous individual areas, such as those designated as reference numerals 64*a* and 64*b*, to create any desired pattern, such as a natural stone surface look (e.g., natural fieldstone surface pattern, flagstone surface pattern, slate surface pattern, etc.).

Figure 8:
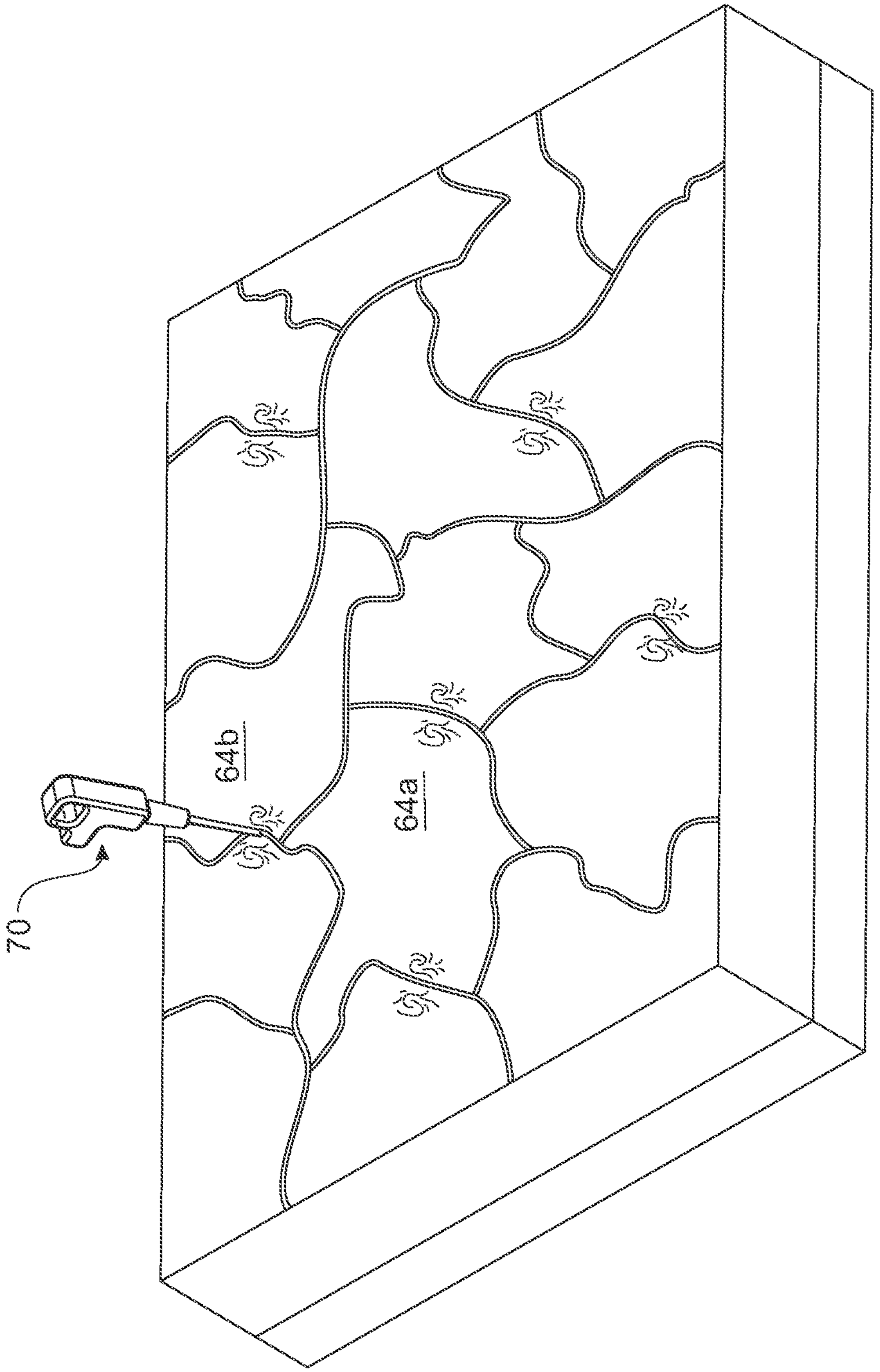
FIG. 8 presents a top isometric view of the concrete slab of FIG. 6, following the steps of cutting, carving, chiseling or hammer chipping the existing cracks with a special chisel bit (specific to the concrete type) and forming grooves along the chalk lines and the cut, carved, chiseled, or chipped cracks to create a desired continuous-groove pattern.

Referring now particularly to FIG. 8, the portions of the concrete surface covered by (or otherwise defined by) the temporary pattern outline—including any incorporated crack segments, joints, and/or other concrete surface imperfections—may be chipped out, routed out, ground out, or otherwise removed using, among other things, one or more unique chipping hammer bits (see FIGS. 14*a*-24*f*) specially designed by the present inventor for use with the inventive method. Generally, existing concrete surface cracks may be opened by cutting, grinding, chipping, etc. along the crack length—using, for example, in at least some implementations, a conventional chipping hammer device 70.

Likewise, alternative (i.e., non-chipping hammer type) devices may be used to chip, cut, etch and otherwise excise concrete along lengths of the marking lines to create a crack, groove or similar desired excised concrete surface feature. As will be apparent to those skilled in the art, a variety of tools are known that may be used for creating or carving cracks, including, but not limited to, a chipping hammer bit or chisel, a diamond saw blade, hydro-blasting tools, high air pressure tools, particulate (e.g. sand) blasting tools, high heat/laser tools, hammers, drills, hammer drills, surface etching tools, gouging tools, and any other existing or future-developed tool capable of loosening and moving material, or creating a crack without moving material.

With that said, in a preferred implementation, the method may incorporate the use of one or more of the unique chipping hammer bits shown in FIGS. 14*a*-24*f*. As described in greater detail herein, at least some of the unique chipping hammer bits are uniquely designed to enable the formation of user defined routed line frameworks, wherein the particular routed line frameworks define corresponding individual, discrete surface areas (i.e., separated by the routed line framework), which may create the appearance of a natural stone surface (e.g., a flagstone surface, a fieldstone surface, etc.) or any other desired artistic pattern. In that regard, the routed line framework may have the appearance of grout lines. In some cases, the routed line framework may subsequently be filled with an actual grout material or other filler material—and/or stained to a desired color and look.

Figure 9:
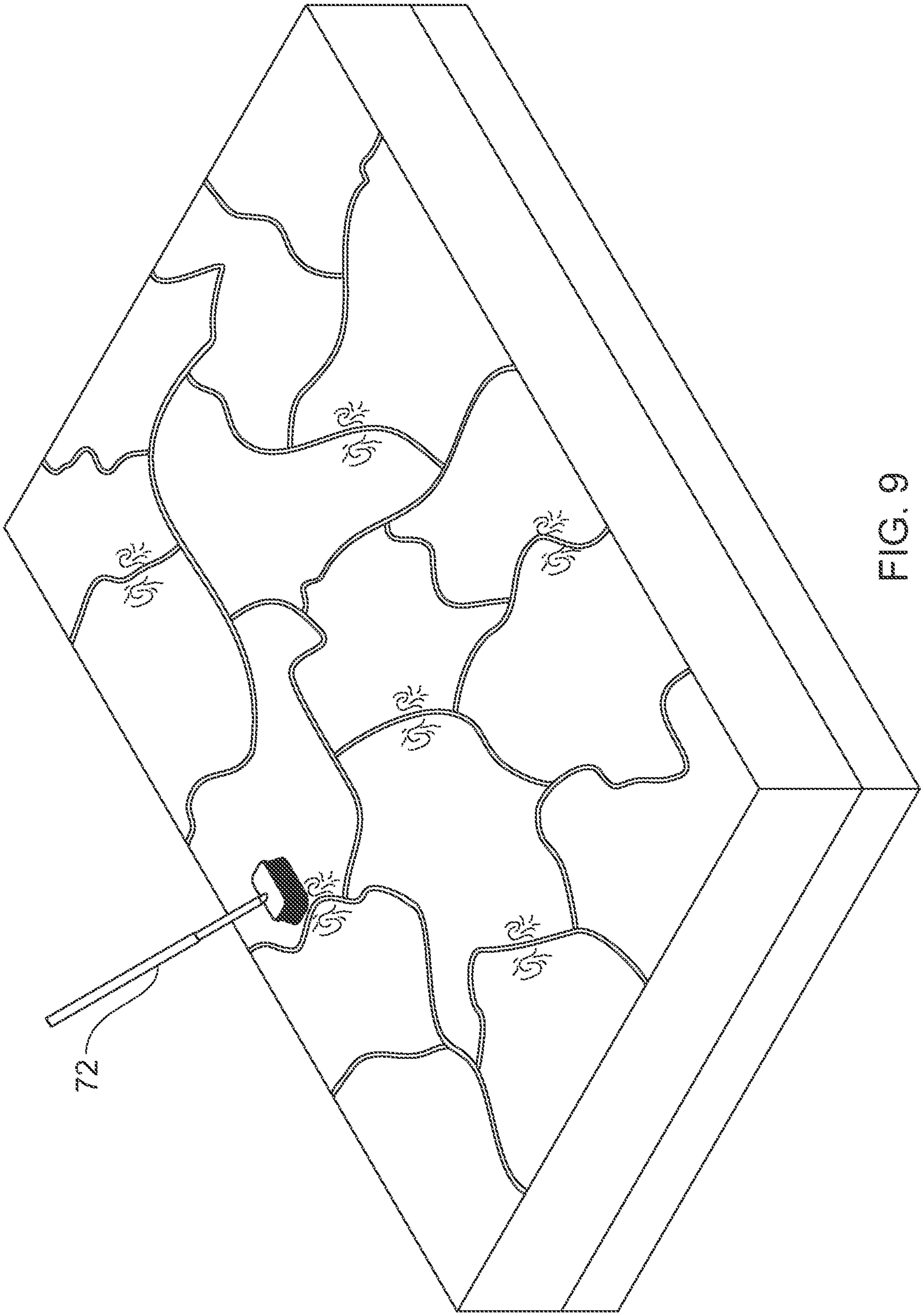
FIG. 9 presents a top isometric view of the concrete slab of FIG. 8, illustrating the step of sweeping or otherwise wiping/clearing away loose concrete particles.
Figure 10:
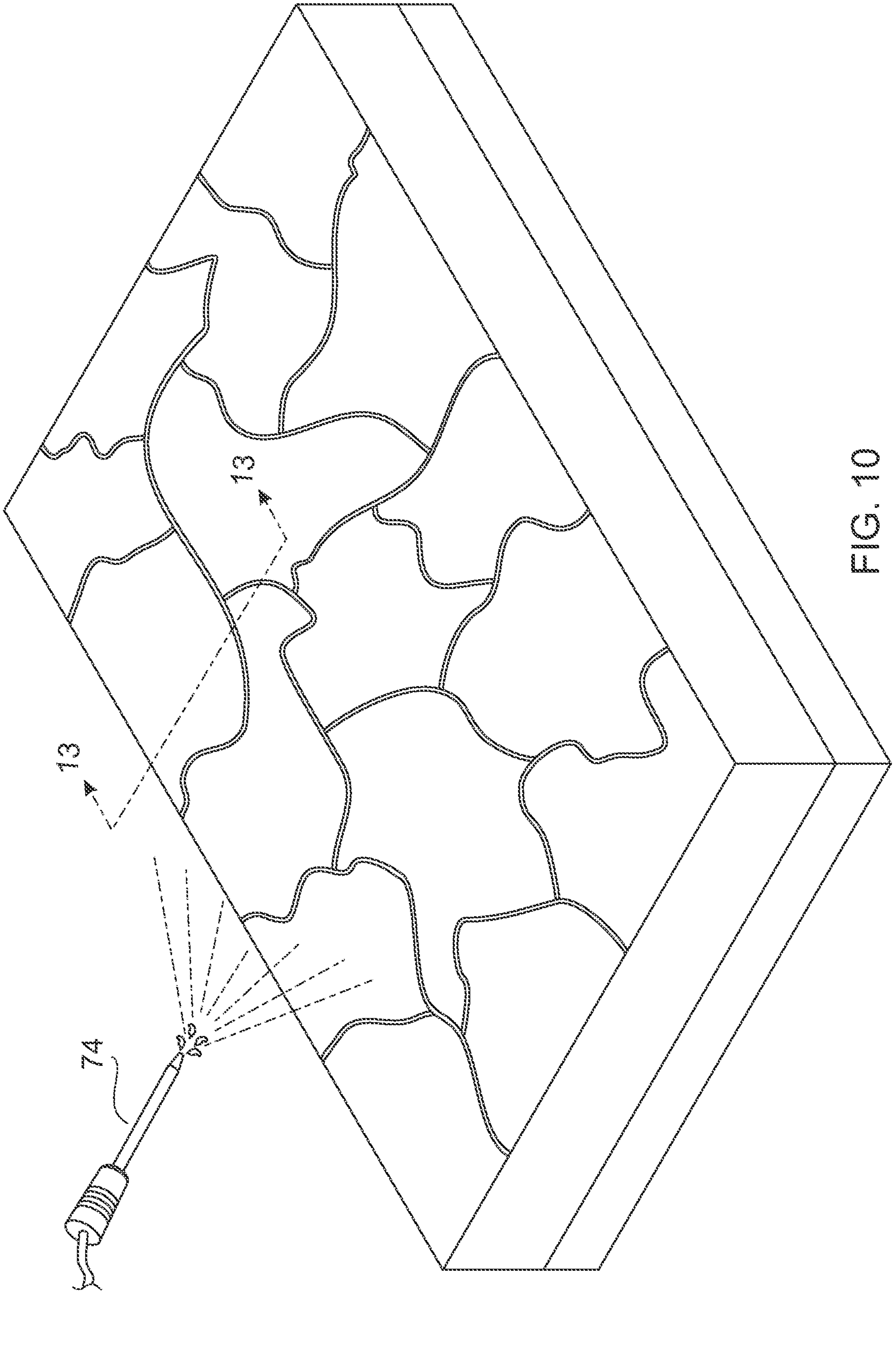
FIG. 10 presents a top isometric view of the concrete slab of FIG. 9, illustrating the step of pressure washing the surface to further clean away any remaining surface debris left in tooled areas and to remove and clean the surface of material to facilitate a clean bond for subsequent application of stains, colors and sealers.

Referring now particularly to FIGS. 9-10, after excising concrete along the marking lines to create the desired concrete surface features (e.g., cracks, grooves, etc.) various tools may be employed to remove undesirable debris from the concrete surface and from within the concrete surface features. For example, a brush 72 may be used to manually sweep large debris from the upper surface of the concrete slab. Furthermore, a high-pressure washing device 74 or the like may be used to remove undesirable debris and other material from both the upper surface of the concrete slab and from within the modified cracks, etc. Moreover, during this step any other undesirable debris, staining and other residue, may be removed. In addition to, or as an alternative to, a hydro-blasting tool, a tool such as a high-pressure particle blaster may be employed, for example, to further improve the bonding ability of a subsequently applied surface treatment layer. Furthermore, a grinding tool can be employed to grind the surface.

Figure 13:
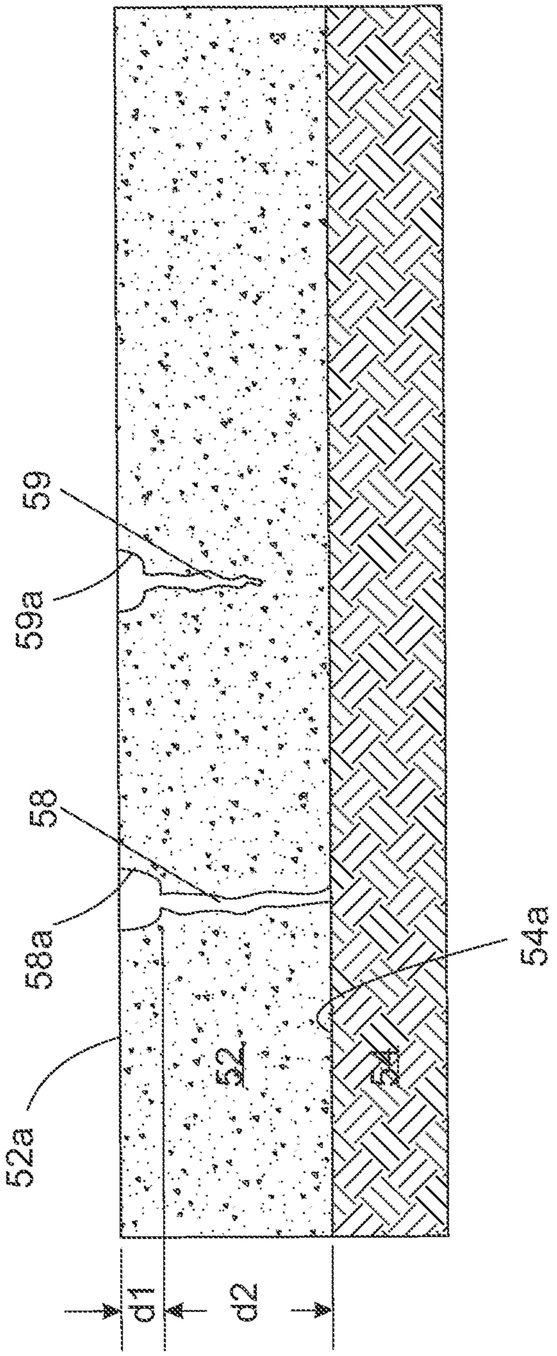
FIG. 13 presents a cross-sectional view taken along partial section lines 13-13 of FIG. 10.

Referring now particularly to FIG. 13, a partial cross-sectional view taken along section lines 13-13 of FIG. 10 illustrates widening of an upper portion of an existing crack 58 extending completely through slab 52, to create widened cut 58*a* having a depth, d1, and corresponding widening of an upper portion of an existing crack 59 extending partially through slab 52, to create widened cut 59*a*—following the step of creating a designed cut along an existing crack and, if necessary, following removal of any residual debris left therein.

Figure 11:
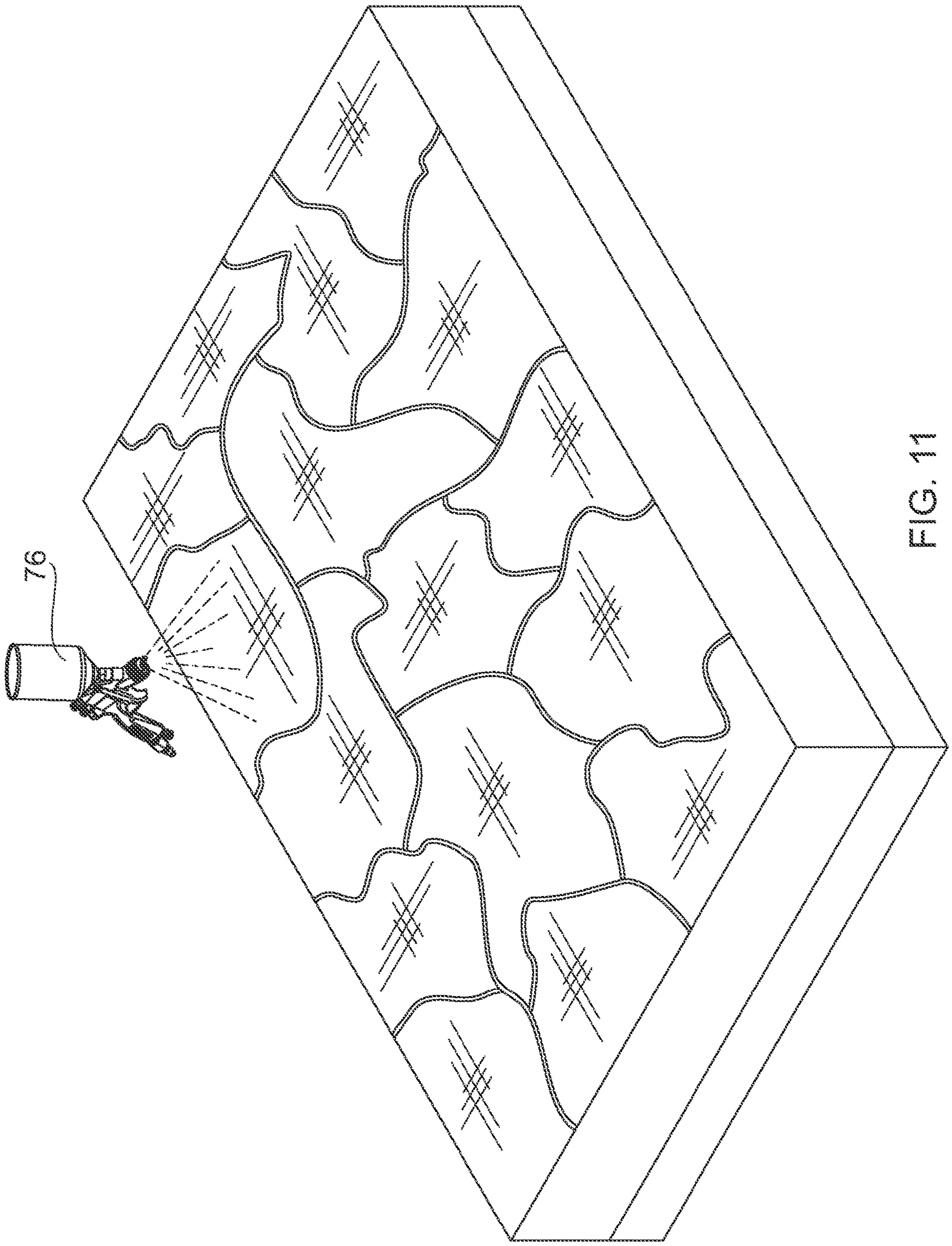
FIG. 11 presents a top isometric view of the concrete slab of FIG. 10, illustrating the step of sealing the exposed cleaned pressure washed concrete surface.

Referring now to particularly to FIG. 11, a surface treatment tool, shown generally as reference numeral 76, may be employed to either deposit a material, which may seep into and through the concrete slab upper surface, or which may form a surface treatment deposition layer upon the upper surface of the concrete slab. By way of example, deposited materials may include colors, dyes, pigments, stains, paints, sealants (e.g., water-based concrete sealant, xylene, acrylic, etc.).

Figure 12:
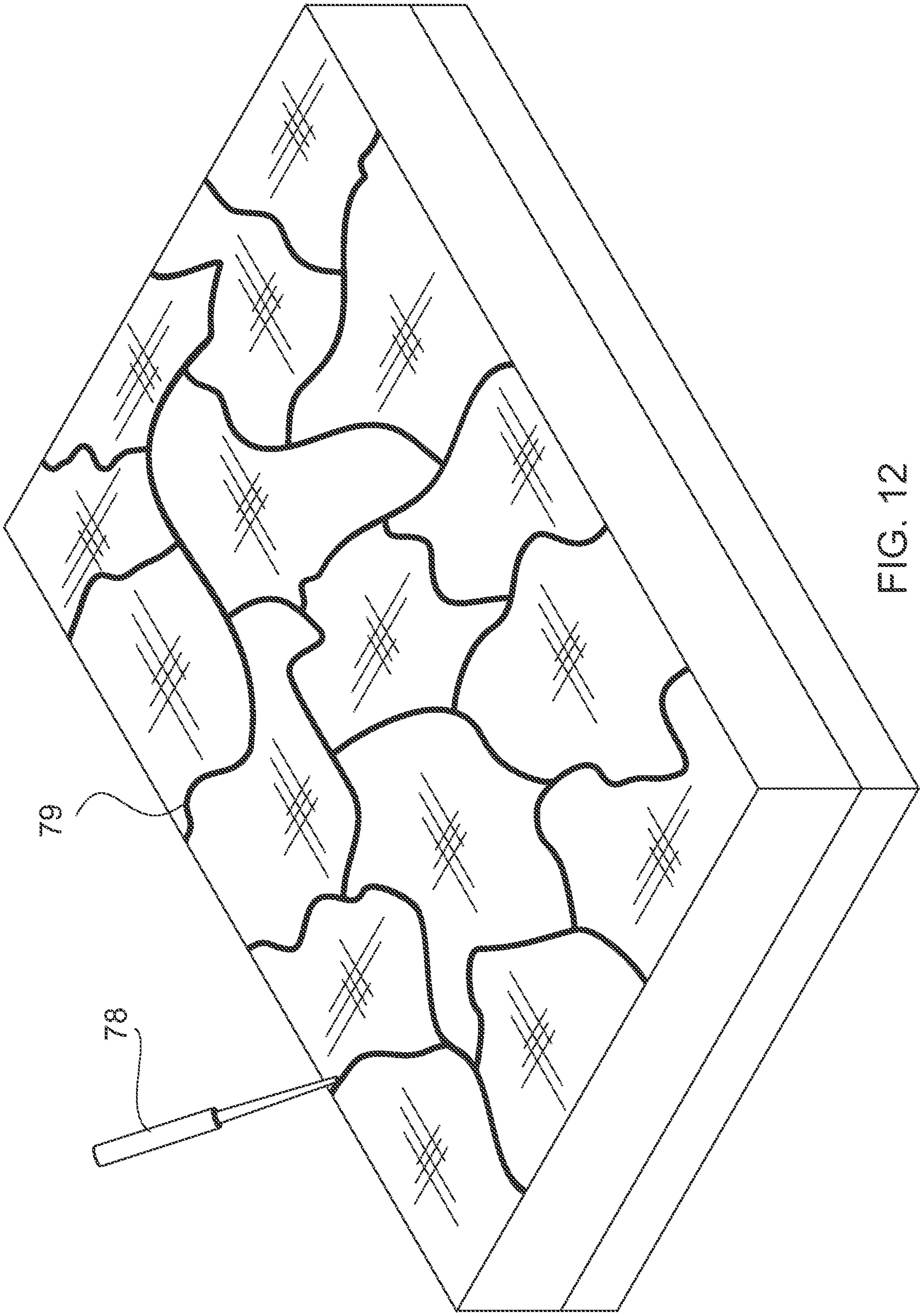
FIG. 12 presents a top isometric view of the concrete slab of FIG. 11, illustrating the optional step of depositing a polymer sealant.

Referring now to FIG. 12, a filler material, generally designated by reference numeral 79 may be deposited, from a filler deposition apparatus 78, into existing cracks, groove, or other created surface feature. As will be apparent to those skilled in the art, any of a myriad of known materials can be used as filler to at least partially fill in a crack opening or any area where debris has been removed, including, but not limited to, concrete, colored concrete, debris created during prior steps of the process, polymeric materials, ceramic materials, and natural materials (e.g., stones, sand, vegetation, grass, etc.).

As referenced above, a series of unique chipping hammer bits have been specially designed by the present inventor for use with the inventive method. Significantly, combinations of the unique chipping hammer bits enable concrete along the marking lines, cracks, etc. to be excised in a manner creating an excised concrete pattern outline closely resembling the grout lines, or other separating lines, of specific natural stone surfaces (e.g., fieldstone, flagstone, round stone, slate, etc.) commonly used during the resurfacing of driveways, patios, walkways and the like. Consequently, the individual, or discrete, areas bounded by the excised pattern outline take on the form of the respective natural stones—particularly, following subsequent coloring, staining, and related surface treatment steps. The present inventor found that it was exceedingly difficult, and in some instances not possible, to effectively mimic many such natural stone looks using conventional chipping hammer bits and related tools. It is not surprising that such unique chipping hammer bits were not available, since the method itself was heretofore unknown.

Referring now generally to FIGS. 14*a* through 24*f*, the unique chipping hammer bits specially designed by the present inventor for use with the inventive process, and their respective functions, will now be described in greater detail.

For the purpose of describing the symmetries and asymmetries of features of the blade bodies in FIGS. 14*a* through 25*f*, the term "central lateral plane" is meant to denote a central vertical plane dividing a blade body into front and rear blade body portions/halves, and the term "central medial plane" is meant to denote a central vertical plane dividing a blade body into left and right lateral blade body portions/halves.

Referring now particularly to FIGS. 14*a*-14*d*, a first convex mortar joint impression bit is generally designated as reference character 100. First convex mortar joint impression bit 100 is particularly well-suited for creating an impression in an exterior (e.g., upper) surface of a concrete slab, such as those previously described with reference to FIGS. 1-13, wherein the impression has a substantially uniform width, and a form closely resembling that of a typical mortar joint between closely-spaced natural stones of a stone surface, such as a driveway, patio, walkway and the like, having a formal field stone surface. That is, mortar joint impression bit 100 is particularly useful for creating a tight-fit mortar joint impression, wherein the perimeters of adjacent discrete faux stone areas appear to be relatively close to one another.

Mortar joint impression bit 100 is generally comprised of a blade body 104 at the working end of an elongated shaft, or shank 102. Blade body 104 is symmetric about both its central lateral plane and its central medial plane. Blade body 104 has a geometry generally defined by a front face 106, an opposite rear face 108, a right lateral side 110, a left lateral side 112, and a bottom 114. Front and rear faces, 106 and 108, respectively, each have an inward linear taper in a direction from the working end of shank 102 toward bottom 114. As best shown in FIG. 14*a*, bottom 114 has a symmetric convex lateral profile extending between opposite bottom ends 114*a* and 114*b*. Furthermore, as best shown in FIGS. 14*c*-14*d*, bottom 114 has a rounded, convex profile extending between front face 106 and rear face 108. The width of rounded, convex bottom 114 (i.e., extending between the front and rear faces, 106 and 108) is uniform across the blade. However, the actual width may vary from bit to bit, depending upon the desired faux stone sizes. For example, small faux stone sizes will necessarily require a relatively smaller gap therebetween than corresponding larger faux stone sizes. Accordingly, the aforementioned width of bottom surface 114 will directly depend upon the faux stone sizes, or areas, desired in a particular case.

Referring now particularly to FIGS. 15*a*-15*d*, a second convex mortar joint impression bit is generally designated as reference character 200. Second convex mortar impression bit 200 is particularly well-suited for creating an impression in an exterior (e.g., upper) surface of a concrete slab, such as those previously described with reference to FIGS. 1-13, wherein a bottom surface 214 of the bit has a linearly tapered, variable width enabling an operator of a corresponding chipping hammer to selectively alter the width of an impression, or cut, made therewith. Second convex mortar impression bit 200 is particularly designed to crush the concrete while maintaining a smooth edge stone look (e.g., like that of a field stone), as opposed to creating a rough chipped edge. That is, to create the look of a weathered stone worn smooth over time.

Mortar joint impression bit 200 is generally comprised of a blade body 204 at the working end of an elongated shaft, or shank 202. Blade body 204 is symmetric about its central lateral plane, but asymmetric about its central medial plane. Blade body 204 has a geometry generally defined by a front face 206, an opposite rear face 208, a right lateral side 210, an opposite left lateral side 212, and a bottom 214. Front and rear faces, 206 and 208, respectively, each have an inward linear taper in a direction from the working end of shank 202 toward bottom 214. Moreover, front and rear faces, 206 and 208, respectively, each have an inward linear taper in a direction from right lateral side 210 toward left lateral side 212. As best shown in FIG. 15*a*, bottom 214 has a symmetric convex lateral profile extending between opposite bottom ends 214*a* and 214*b*. Furthermore, as best shown in FIGS. 15*c*-15*d*, bottom 214 has a rounded profile extending between front face 206 and rear face 208. The width of rounded, convex bottom 214 (i.e., extending between the front and rear faces, 206 and 208) varies laterally across the blade body 204.

Referring now particularly to FIGS. 16*a*-16*d*, a third convex mortar joint impression bit is generally designated as reference character 300. Third convex mortar joint impression bit 300 is particularly well-suited for creating a fixed width, fixed depth, linear impression, or cut, in an exterior (e.g., upper) surface of a concrete slab, such as those previously described with reference to FIGS. 1-13, wherein the resulting cut has a uniform width and depth. Third convex mortar joint impression bit 300 is particularly designed to create a more formal stone look (e.g., slate), as well as to generally cut through harder concrete surfaces.

Figure 16D:
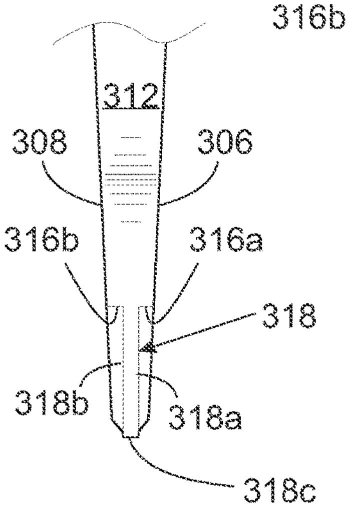
Figure 16C:
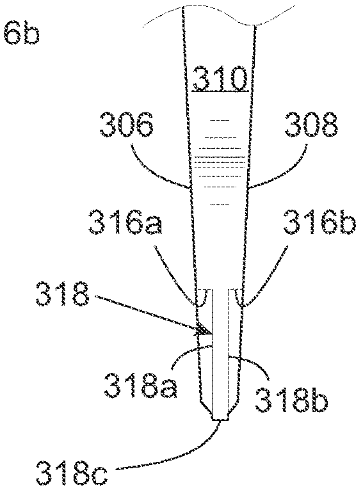

Mortar joint impression bit 300 is generally comprised of a blade body 304 at the working end of an elongated shaft, or shank 302. Blade body 304 is symmetric about both its central lateral plane and its central medial plane. Blade body 304 has a geometry generally defined by a front face 306, an opposite rear face 308, a right lateral side 310, a left lateral side 312, and a bottom generally designated as reference character 314. Front and rear faces, 306 and 308, respectively, each have an inward linear taper in a direction from the working end of shank 302 toward bottom 314. As best shown in FIG. 16*a*, bottom 314 has a symmetric convex lateral profile extending between opposite bottom ends 314*a* and 314*b*. Furthermore, as best shown in FIGS. 16*c*-16*d*, bottom 314 has a stepped profile, defined by a raised feature 318 protruding outwardly between front and rear shoulders, 316*a* and 316*b*, of bottom 314. That is, the raised feature 318 has a stepped profile defined by a front surface 318*a*, a rear surface 318*b*, and a bottom surface 318*c*.

The width of raised feature 318 (i.e., extending between the front and rear surfaces, 318*a* and 318*b*) is uniform across the bottom 314 of blade body 304. Furthermore, the height of raised feature 318 is uniform across the bottom 314 of blade body 304. However, the actual width and height of raised feature 318 may vary from bit to bit, depending upon the width and depth of the resulting linear cut desired.

Referring now particularly to FIGS. 17*a*-17*d*, a fourth convex mortar joint impression bit is generally designated as reference character 400. Fourth convex mortar joint impression bit 400 is particularly well-suited for creating a variable width, fixed depth, linear impression, or cut, in an exterior (e.g., upper) surface of a concrete slab, such as those previously described with reference to FIGS. 1-13. It is very effective creating a non-uniform mortar joint, or non-uniform space, between adjacent areas to impart the look of a natural stone (e.g., a fieldstone).

Figure 17A:
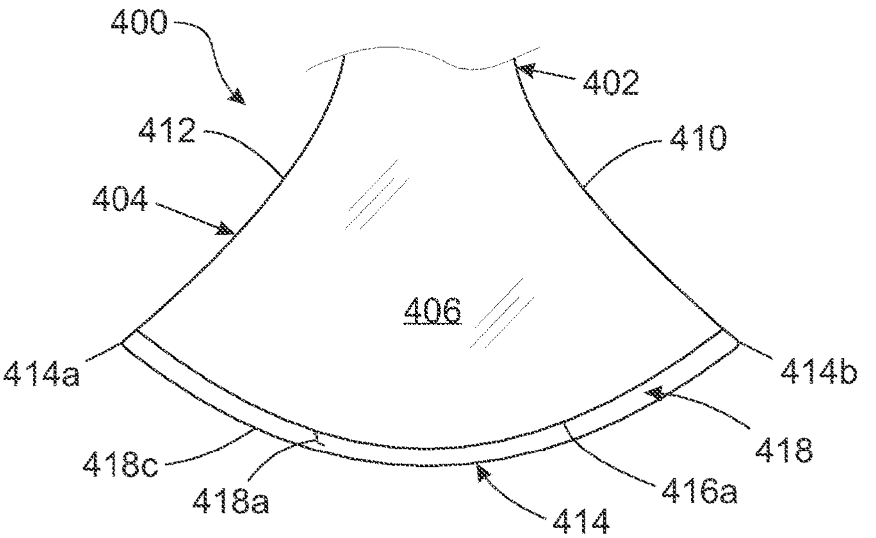
FIGS. 17*a*-17*d* present respective front, bottom, right side, and left side views of a convex blunt nose mortar joint impression chipping hammer bit having a raised, concave (variable width) impression portion extending outwardly from the bottom surface of the bit blade.
Figure 17B:
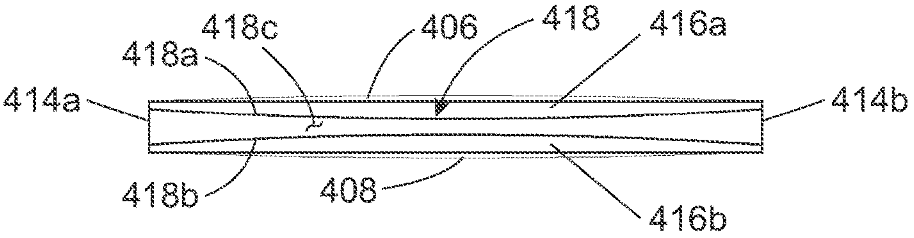
Figure 17D:
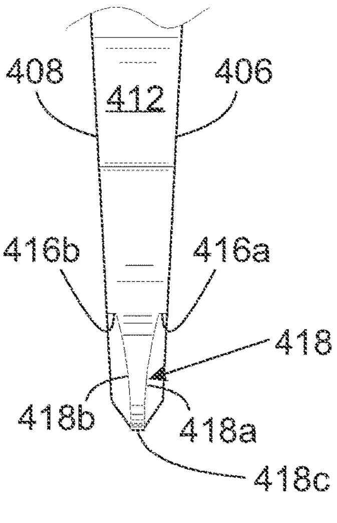
Figure 17C:
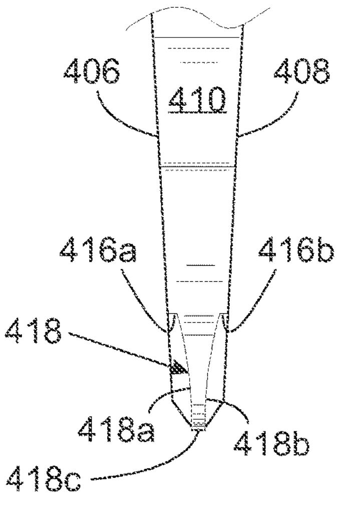

Mortar joint impression bit 400 is generally comprised of a blade body 404 at the working end of an elongated shaft, or shank 402. Blade body 404 is symmetric about both its central lateral plane and its central medial plane. Blade body 404 has a geometry generally defined by a front face 406, an opposite rear face 408, a right lateral side 410, a left lateral side 412, and a bottom generally designated as reference character 414. Front and rear faces, 406 and 408, respectively, each have an inward linear taper in a direction from the working end of shank 402 toward bottom 414. As best shown in FIG. 17*a*, bottom 414 has a symmetric convex lateral profile extending between opposite bottom ends 314*a* and 314*b*. Furthermore, as best shown in FIGS. 17*c*-17*d*, bottom 414 has a stepped profile, defined by a raised feature 418 protruding outwardly between front and rear shoulders, 416*a* and 416*b*, of bottom 414. That is, the raised feature 318 has a stepped profile defined by a front surface 418*a*, a rear surface 418*b*, and a bottom surface 418*c*. Furthermore, front surface 418*a* and rear surface 418*b* both have concave profiles, together defining the varying width of raised feature 418 between left end 414*a* and right end 414*b* of bottom 414.

The width of raised feature 418 (i.e., extending between the front and rear surfaces, 418*a* and 418*b*) is variable across the bottom 414 of blade body 404. Furthermore, the height of raised feature 418 is uniform across the bottom 414 of blade body 404. However, the actual widths and height of raised feature 418 may vary from bit to bit, depending upon the relative widths and depth of the resulting linear cut desired.

Referring now particularly to FIGS. 18*a*-18*f*, a fifth convex mortar joint impression bit is generally designated as reference character 500. Fifth convex mortar joint impression bit 500 is particularly well-suited for creating an impression, or a cut, in an exterior (e.g., upper) surface of a concrete slab, such as those previously described with reference to FIGS. 1-13, wherein a bottom surface 514 of the bit has a linearly tapered, variable width enabling an operator of a corresponding chipping hammer to selectively alter the width of an impression, or cut, made therewith (i.e., primarily for aesthetic purposes). In other words, an operator can selectively and controllably vary a width of an existing crack in the travel direction of mortar joint impression bit 500. Convex mortar joint impression bit 500 enables an operator to remove an upper portion of an existing crack to transition a zigzagging jagged crack into a straighter, smoother, wider groove. Significantly, the newly formed upper groove serves, or functions, as a relief joint to allow for some concrete movement, or translation, during natural concrete expansion and contraction. Moreover, as described in greater detail below, mortar joint impression bit 500 is uniquely designed to enable an operator to selectively alter the appearance of a naturally occurring concrete crack to create a cut, or crack, having a jagged edge and an opposite smooth edge—creating a concrete surface closely imitating a natural fieldstone surface appearance.

Figure 18A:
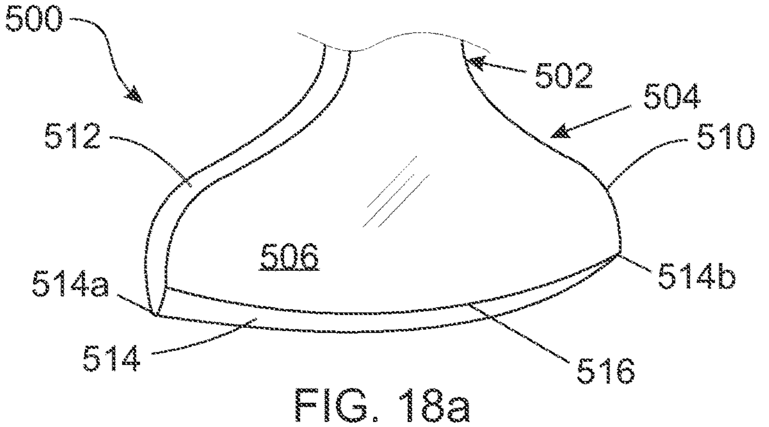
FIG. 18*a* presents a front-lower-left side perspective view of a convex, blunt nose mortar joint impression chipping hammer bit having a vertically-angled, tapered blade thickness for enabling a chipping hammer operator to controllably vary the respective width of a mortar joint impression being imparted upon the concrete surface along the length of a crack segment.
Figure 18C:
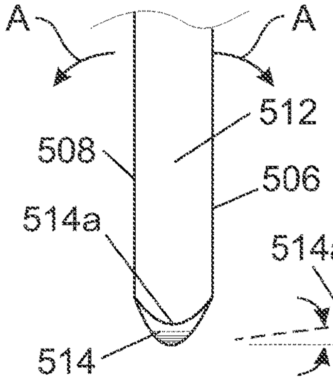
FIGS. 18*b*-18*f* present respective front, left side, right side, bottom, and rear views of the mortar joint impression chipping hammer bit introduced in FIG. 18*a;*
Figure 18B:
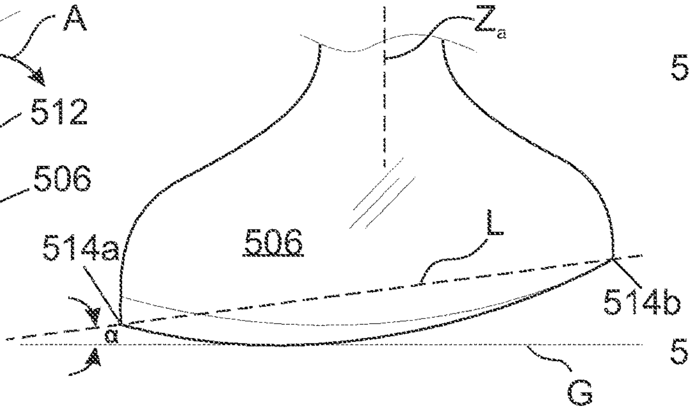
Figure 18D:
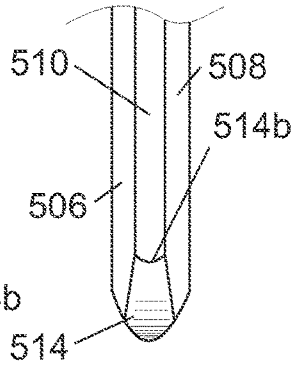
Figure 18E:
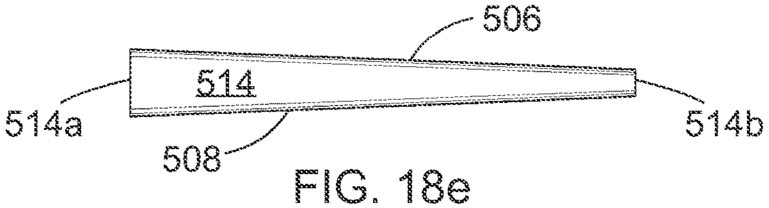
Figure 18F:
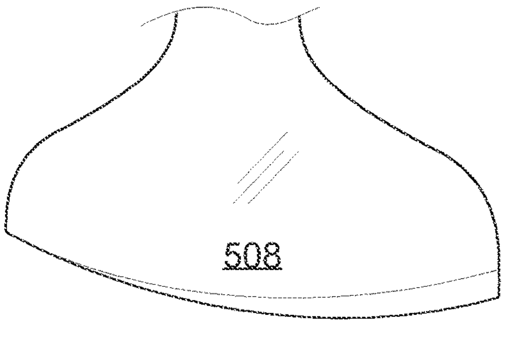

Mortar joint impression bit 500 is generally comprised of a blade body 504 at the working end of an elongated shaft, or shank 502. Blade body 504 is symmetric about its central lateral plane, but asymmetric about its central medial plane. Blade body 504 has a geometry generally defined by a front face 506, an opposite rear face 508, a right lateral side 510, an opposite left lateral side 512, and a bottom 514. Front and rear faces, 506 and 508, respectively, each have an inward linear taper in a direction from left lateral side 512 toward right lateral side 510. As best shown in FIG. 18*b*, bottom 514 has an asymmetric convex lateral profile extending between opposite bottom ends 514*a* and 514*b*. Furthermore, the length of right lateral side 510 is shorter than the corresponding length of left lateral side 512, such that right end 514*b* (alternative referred to as leading edge 514*b*) of bottom 514 is farther from the ground (G) than left end 514*a* (alternatively referred to as trailing end 514*a*) when the central axis (Z) of shank 502 is oriented perpendicular to the ground. The angle (α) between the ground (G) and a line (L) connecting left and right ends, 514*a* and 514*b*, is greater than 0° and has a maximum of 45° (i.e., $0° < \alpha \leq 45°$). Preferably, the angle (α) between ground (G) and line (L) falls within a range of 15° to 30° (i.e., $15° \leq \alpha \leq 30°$). Furthermore, as best shown in FIGS. 18*c*-18*d*, bottom 514 has a rounded profile extending between front face 506 and rear face 508. The width of rounded, convex bottom 514 (i.e., extending between the front and rear faces, 506 and 508) varies laterally across the blade body 204. Significantly, this rounded profile functions to limit the depth of a resulting cut; preventing the creation of an undesirable deep cut. Moreover, the bluntness of bottom edge 514 makes mortar joint impression bit 500 particularly well suited for use on so-called "soft" and "medium-soft" concrete surfaces. Generally, a concrete surface may be categorized as "soft" to "medium-soft" when it has a compressive strength in the range of 2500 to 3400 psi, or 18 to 23.7 MPa. Correspondingly, a concrete surface may be categorized as "medium-hard" to "hard" when it has a compressive strength in the range of 4100 to 6000 psi, or 28.7 to 40 MPa. So-called "soft concrete" may also refer to concrete that is in a deteriorating (e.g., brittle) state, which is common with older concrete.

As noted above, the profile of blade body 504—and particularly the profile of bottom 514—enables an operator of a chipping hammer (not shown) carrying the mortar joint impression bit 500 to selectively and controllably vary the resulting width (and depth) of a widened upper portion of an existing concrete surface crack. In particular, an operator directs the travel of mortar joint impression bit 500 along a length of an existing concrete surface crack in the direction of leading edge 514*b*. By tilting the central axis (Z) of shank 502 forward toward leading edge 514*b* (i.e., reducing the angle (α) of line (L)), a relatively reduced width, thinner portion of the bottom 514 of blade body 504 is used to widen an upper portion of an existing crack. Conversely, by tilting central axis (Za) of shank 502 rearward toward trailing edge 514*a* (i.e., increasing the angle (α) of line (L)), a relatively increased width, wider portion of the bottom 514 of blade body 504 is used to widen an upper portion of an existing crack. Furthermore, by selectively altering the downward force of mortar joint impression bit 500 against the surface of the ground (G) and operator can control the depth of the upper widened portion of an existing crack. Furthermore, referring specifically to FIG. 18*c*, by laterally tilting the mortar joint impression bit 500 (i.e., via respective lateral tilting of the corresponding chipping hammer)—as depicted by the arrows (A)—blade body 504 may travel along an existing jagged crack at an acute angle (i.e., less than 90°) such that the side of the crack being contacted by the inwardly leaned portion of bottom 514 of traveling blade body 504 is flaked off to create a jagged crack edge profile, while the opposite side of the crack being contacted by the outwardly leaned portion of bottom 514 is smoothed out. In other words, by laterally leaning the chipping hammer (and attached bit 500), an operator can flake off one side of a jagged crack, while creating a smooth adjacent opposite side of the jagged crack. As noted above, in this manner mortar joint impression bit 500 may be employed to create a concrete surface closely imitating a natural fieldstone surface.

Referring now particularly to FIGS. 19*a*-19*g*, a dual function, tapered, planar bottom mortar joint impression bit is generally designated as reference character 600. Mortar joint impression bit 600 may be employed to create a tapered linear impression in a soft concrete surface, wherein a bottom surface of the resulting impression is planar (i.e., the bit 600 imparts a planar impression into the soft concrete surface). Furthermore, mortar joint impression bit 600 can be used on “medium-hard” or “hard” concrete surfaces to widen an existing concrete surface impression without cutting too deep into the concrete. A bottom surface 614 of the bit 600 has a linearly tapered, variable width enabling an operator of a corresponding chipping hammer to selectively alter the width of a cut made therewith (i.e., primarily for aesthetic purposes). In other words, an operator can selectively and controllably vary a width of an existing cut in the travel direction of mortar joint impression bit 600.

Figure 19A:
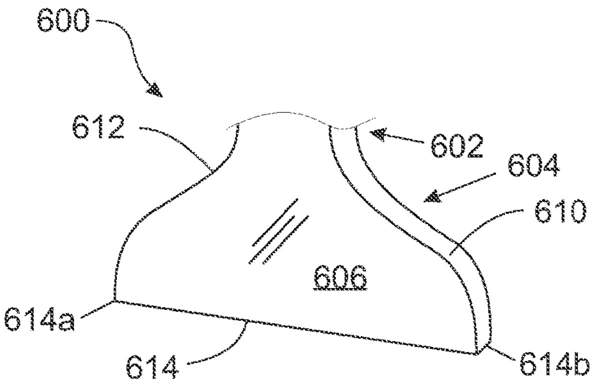
FIG. 19*a* presents a front-upper-right side perspective view of a dual-function (i.e., mortar joint impression and crack widening), angled, inwardly tapered (variable width), flat bottom chipping hammer bit used in accordance with the method of the present invention.
Figure 19B:
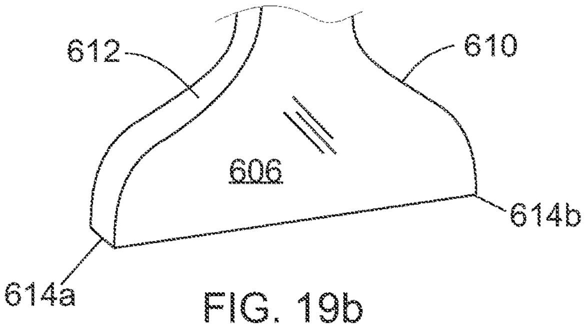
FIG. 19*b* is a front-upper-left side perspective view of the dual-function chipping hammer bit introduced in FIG. 19*a;*
Figure 19D:
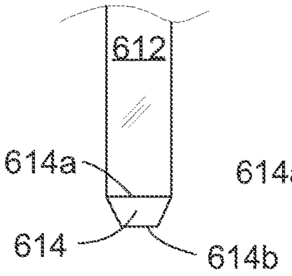
FIGS. 19*c*-19*g* present respective front, right, left, bottom, and rear side views of the dual-function chipping hammer bit introduced in FIG. 19*a;*
Figure 19C:
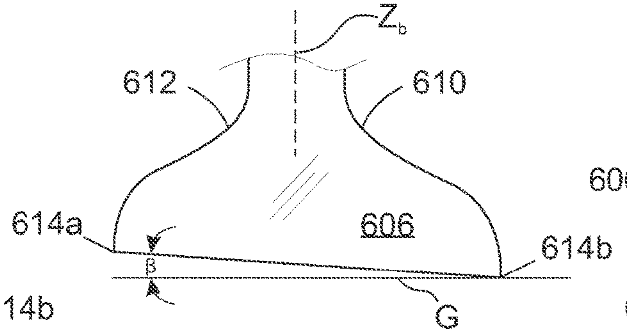
Figure 19E:
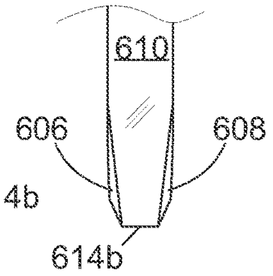
Figure 19F:
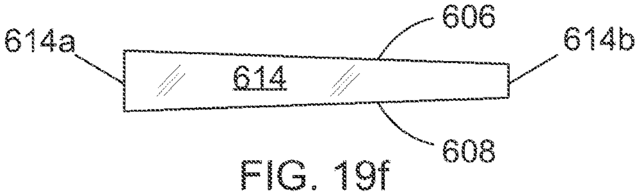
Figure 19G:
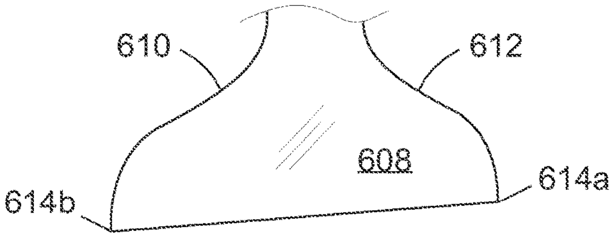
Figure 20A:
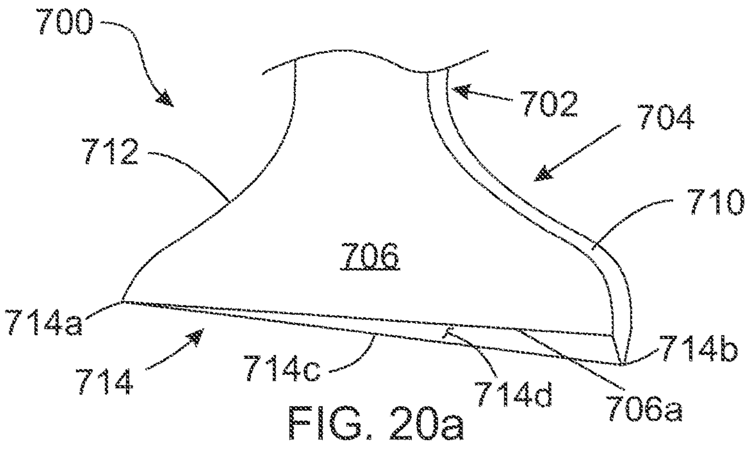
FIG. 20*a* present a front-lower-right side perspective view of an adjustable/variable width, bi-directional chipping hammer bit for use with the method of the present invention.
Figure 20C:
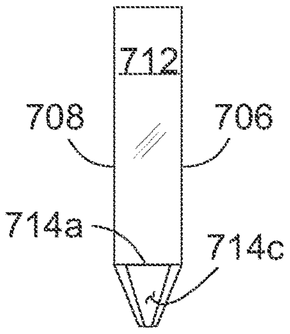
FIGS. 20*b*-20*f* present respective front, left, right, bottom, and rear side views of the bi-directional chipping hammer bit introduced in FIG. 20*a;*
Figure 20B:
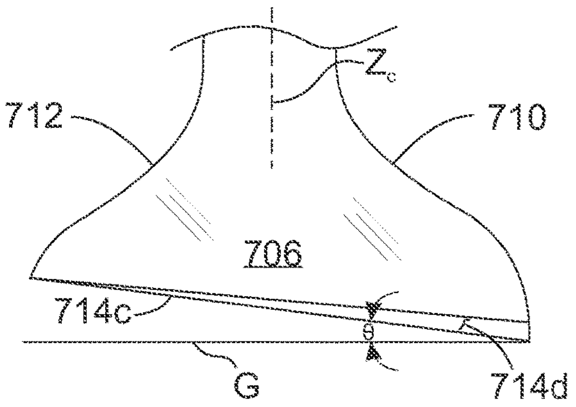
Figure 20D:
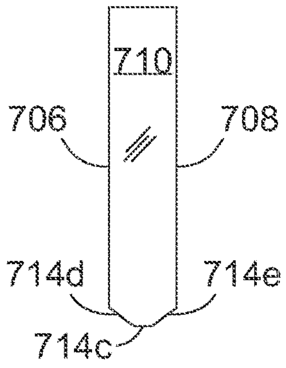
Figure 20E:
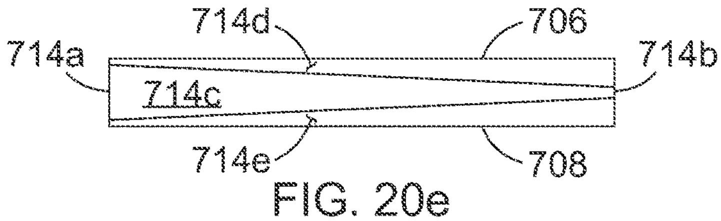
Figure 20F:
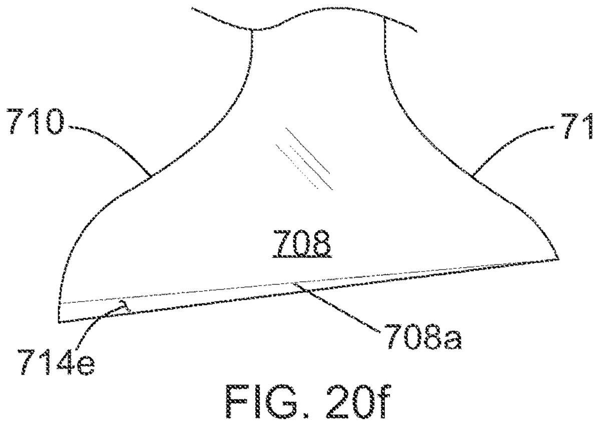
Figure 21A:
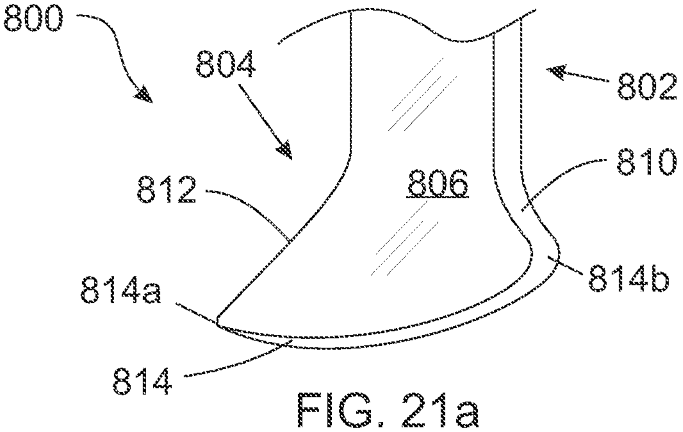
FIG. 21*a* presents a front-lower-right side perspective view of a narrow radius tip chipping hammer bit for use with the method of the present invention.
Figure 21C:
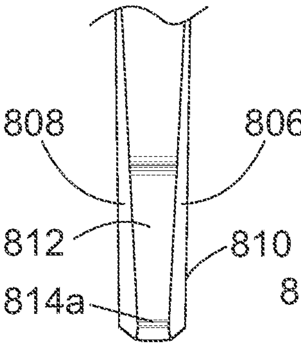
FIGS. 21*b*-21*f* present respective front, left, right, bottom, and rear side views of the narrow radius tip chipping hammer bit introduced in FIG. 21*a;*
Figure 21B:
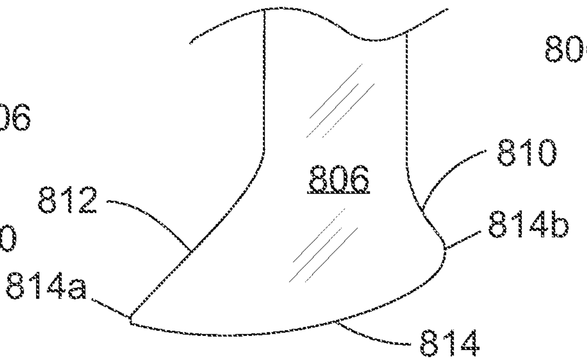
Figure 21D:
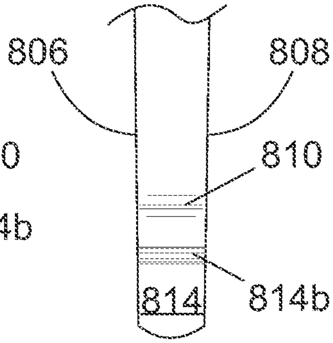
Figure 21E:
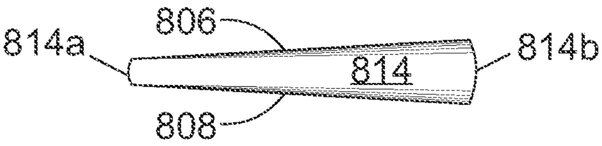
Figure 21F:
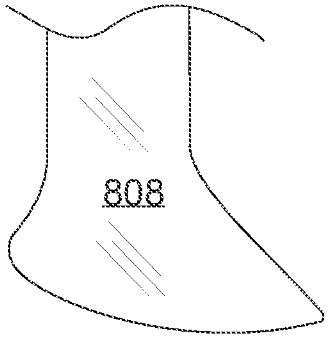
Figure 22A:
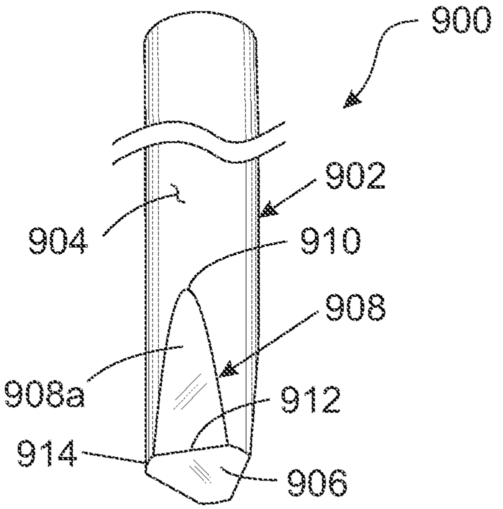
FIG. 22*a* presents a bottom perspective view of a multi-rock intersection edge removal chipping hammer bit for use with the method of the present invention.
Figure 22B:
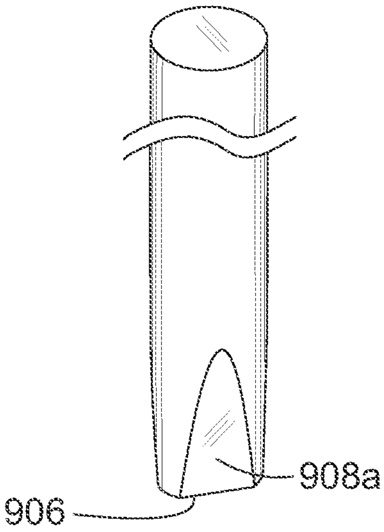
FIG. 22*b* presents an upper perspective view of the multi-rock intersection edge removal chipping hammer bit introduced in FIG. 22*a;*
Figure 22C:
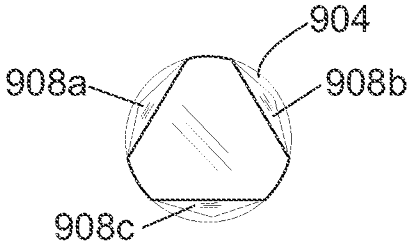
FIGS. 22*c* and 22*d* present respective bottom and top views of the multi-rock intersection removal chipping hammer bit introduced in FIGS. 22*a* and 22*b;*
Figure 22D:
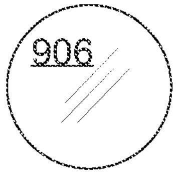
Figure 22E:
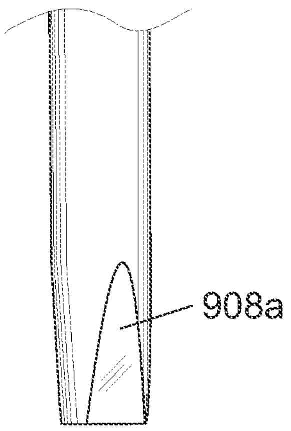
FIGS. 22*e*-22*g* present a series of side views (offset by 60 degrees from one another) of the multi-rock intersection edge removal chipping hammer bit introduced in FIGS. 22*a* and 22*b;*
Figure 22F:
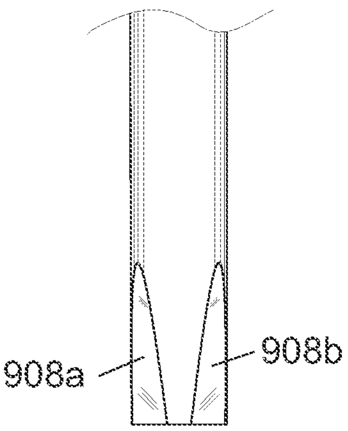
Figure 22G:
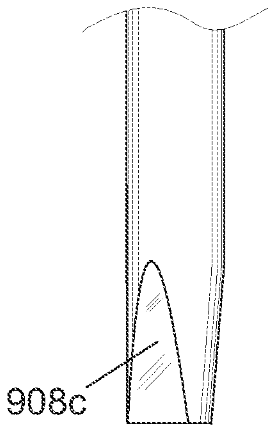

Mortar joint impression bit 600 is generally comprised of a blade body 604 at the working end of an elongated shaft, or shank 602. Blade body 604 is symmetric about its central lateral plane, but asymmetric about its central medial plane. Blade body 604 has a geometry generally defined by a front face 606, an opposite rear face 608, a right lateral side 610, an opposite left lateral side 612, and a bottom 614. Front and rear faces, 606 and 608, respectively, each have an inward linear taper in a direction from left lateral side 612 toward right lateral side 610. As best shown in FIG. 19*b*, bottom 614 has an asymmetric linear lateral profile extending between opposite bottom left end 614*a* and bottom right end 614*b*. Furthermore, the length of right lateral side 610 is greater, or longer, than the corresponding length of left lateral side 612, such that right end 614*b* (alternative referred to as leading edge 614*b*) of bottom 614 is farther from the ground (G) than left end 614*a* (alternatively referred to as trailing end 614*a*) when the central axis ($Z_b$) of shank 602 is oriented perpendicular to the ground (G). The angle (β) between the ground (G) and bottom 614 is greater than 0° and has a maximum of 45°(i.e., 0°<β≤45°). Preferably, the angle (β) between ground (G) and bottom 614 falls within a range of 15° to 30°(i.e., 15°≤β≤30°). Furthermore, as best shown in FIGS. 19*d*-19*f*, bottom 614 has a flat, or planar, profile extending between front face 606 and rear face 608. The width of tapered, planar bottom 614 (i.e., extending between the front and rear faces, 606 and 608) varies laterally across the blade body 604.

As noted above, the profile of blade body 604—and particularly the profile of bottom 614—enables an operator of a chipping hammer (not shown) carrying the mortar joint impression bit 600 to selectively and controllably vary the resulting width of an existing cut. In particular, an operator directs the travel of mortar joint impression bit 600 along a length of an existing concrete surface cut in the direction of leading edge 614*b*. By tilting the central axis ($Z_b$) of shank 602 rearward toward trailing edge 614*a* (i.e., decreasing the angle (β) between the ground (G) and bottom 614), a relatively increased width, wider portion of the bottom 614 of blade body 604 is used to widen an existing concrete cut.

Referring now particularly to FIGS. 20*a*-20*f*, a dual-direction, variable width, tapered flat bit is generally designated as reference character 700. Tapered flat bit 700 is generally comprised of a blade body 704 at the working end of an elongated shaft, or shank 702. Blade body 704 is symmetric about its central lateral plane, but asymmetric about its central medial plane. Blade body 704 has a geometry generally defined by a front face 706, an opposite rear face 708, a right lateral side 710, an opposite left lateral side 712, and a bottom generally designated by reference character 714. Front and rear faces, 706 and 708, respectively, each have a non-tapered, linear profile (i.e., front and rear faces, 706 and 708, are parallel to one another).

Laterally, bottom 714 has a generally linear taper. Furthermore, the length of right lateral side 710 is greater, or longer, than the corresponding length of left lateral side 712, such that right end 714*b* (alternatively referred to as forward, right edge 714*b*) of bottom 714 is farther from the ground (G) than left end 714*a* (alternatively referred to as rearward, left edge 714*a*) when the central axis ($Z_c$) of shank 702 is oriented perpendicular to the ground (G). The angle (θ) between the ground (G) and bottom surface 714*c* is greater than 0° and has a maximum of 45°(i.e., 0°<6≤45°). Preferably, the angle (θ) between ground (G) and bottom surface 714*c* falls within a range of 15° to 30°(i.e., 15°≤θ≤30°).

Bottom 714 has a unique flat bottom V-shaped profile extending between opposite bottom left end 714*a* and bottom right end 714*b*. In particular, the profile of bottom 714 is further defined by the following planar surfaces: (a) laterally- and vertically-tapered, planar, bottom surface 714*c*; (b) laterally- and vertically-tapered, planar bottom surface 714*d* interconnecting bottom surface 714*c* with blade body front face 706; and (c) laterally- and vertically-tapered, planar bottom surface 714*e* interconnecting bottom surface 714*c* with blade body rear face 708. Accordingly, the flat bottom portion of the flat bottom V-shaped profile has a linearly increasing width in a direction from forward, right end 714*b* toward rearward, left end 714*a*. Furthermore, the flat bottom portions, 714*c* and 714*d*, of the flat bottom V-shaped profile have linearly decreasing widths in a direction from rearward, left end 714 toward forward, right end 714*b*.

Tapered flat bit 700 is uniquely designed to create an initial cut in a concrete surface via movement in a forward direction of travel (i.e., in the direction of forward, right end 714*b*), and a corresponding widening of the initial cut via movement in a reverse direction of travel (i.e., in the direction of rearward, left end 714*a*) over the initial cut, at a reduced angle (8) between the bottom surface 714*c* of blade body 704 and ground (G).

Referring now particularly to FIGS. 21*a*-21*f*, a narrow radius tip bit is generally designated as reference character 800. Narrow radius tip bit 800 is particularly well-suited for creating an impression, or cut, in an exterior (e.g., upper) surface of a concrete slab, such as those previously described with reference to FIGS. 1-13, wherein the resulting impression, or cut, has a variable width, and a form closely resembling that of a typical mortar joint between natural round stones of a stone surface, such as a driveway, patio, walkway and the like having a round stone surface. In other words, since natural round stones do not lay perfectly, narrow radius tip bit 800 enables an operator to mimic the natural, uneven look of an actual round stone surface.

Narrow radius tip bit 800 is generally comprised of a blade body 804 at the working end of an elongated shaft, or shank 802. Blade body 804 is symmetric about its central lateral plane, but asymmetric about its central medial plane. Blade body 804 has a geometry generally defined by a front face 806, an opposite rear face 808, a right lateral side 810, an opposite left lateral side 812, and a bottom generally designated by reference character 814. Front and rear faces, 806 and8, respectively, each have a tapered, linear profile (i.e., front and rear faces, 806 and 808, taper inwardly in a direction from right lateral side 810 (i.e., rear/trailing edge 810) toward left lateral side 812 (i.e., forward/leading edge 812). Bottom surface 814 has a rounded profile extending between front and rear faces, 806 and 808. Furthermore, both forward/lead edge 814*a* and rearward/trailing edge 814*b* are radiused as shown in the accompanying drawing figures.

Referring now particularly to FIGS. 22*a*-22*g*, a unique three-rock intersection bit 900 is provided for removing pointy edges of an existing concrete impression, or cut, where the perimeters of three faux rock concrete surface areas meet. In this manner, the three-rock intersection bit creates a natural-looking area between three adjacent faux stone areas. In other words, the three-rock intersection bit modifies the area where three previously created, different impression/cut lines meet to define a modified intersection area closely resembling the appearance of such an area on an actual stone surface.

Three-rock intersection bit 900 generally comprises a cylindrical body 902 at its working end, wherein the cylindrical body is defined by an outer surface 904, a bottom end 906, and three radially-spaced parabolic flats 908*a*, 908*b* and 908*c* (shown collectively as reference numeral 908) at its lower end. The surface area shape, or geometry, of each of the parabolic flats 908 is further defined by a vertex 910 and a linear lower end 912 adjoining each of the parabolic flats with bottom end 906. Cylindrical body 902 may have a slight inward taper at a lower end portion thereof—creating three radially-spaced parabolic flats 908*a*, 908*b*, 908*c* each having a corresponding slight inward taper in a direction from vertex 910 toward linear lower end 912. Significantly, the three radially-spaced parabolic flats 908*a*, 908*b* and 908*c*, together, define a planar bottom end 906 having the general form of a triangle with three linear segments 912 interconnected by three corresponding curved segments 914.

Referring now particularly to FIGS. 23*a*-23*f*, a concave bottom cutting, or chipping, bit is generally designated as reference character 1000. Cutting bit 1000 may be employed to create formal straight edged polygonal shapes upon a concrete surface. For example, cutting bit 1000 is particularly useful for creating a faux slate stone look upon a concrete surface. Cutting bit 1000 has a geometry similar to the dual function, tapered, planar bottom mortar joint impression bit 600 (shown in FIGS. 19*a*-19*g*), except that cutting bit 1000 has a non-tapering, concave bottom 1014 in lieu of the linearly tapering, planar bottom 614 of the dual function mortar joint impression bit 600.

Concave bottom cutting bit 1000 is generally comprised of a blade body 1004 at the working end of an elongated shaft, or shank 1002. Blade body 1004 is symmetric about its central lateral plane, but asymmetric about its central medial plane. Blade body 1004 has a geometry generally defined by a front face 1006, an opposite rear face 1008, a right lateral side 1010, an opposite left lateral side 1012, and a bottom 1014. Front and rear faces, 1006 and 1008, respectively, each have an inward linear taper in a direction from shank 1002 toward bottom 1014.

Figure 23A:
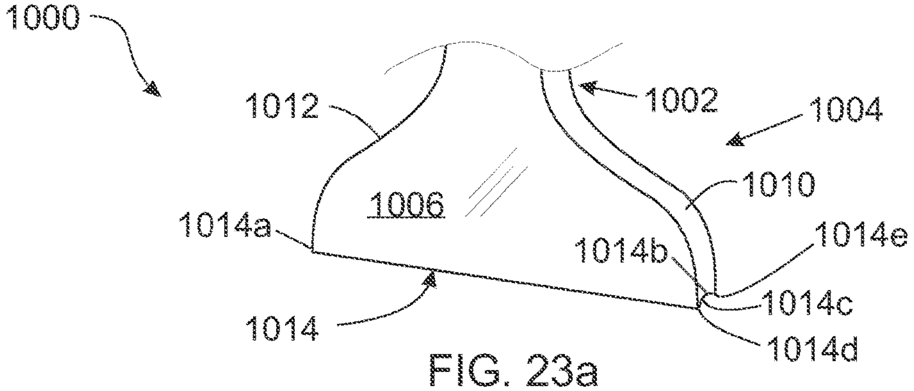
FIG. 23*a* presents a front-upper-right side perspective view of an angled, inwardly tapered, concave bottom chipping hammer bit for creating formal, jagged, straight-edged geometric shapes imparting a natural slate stone look in a concrete surface, for use in accordance with the method of the present invention.
Figure 23C:
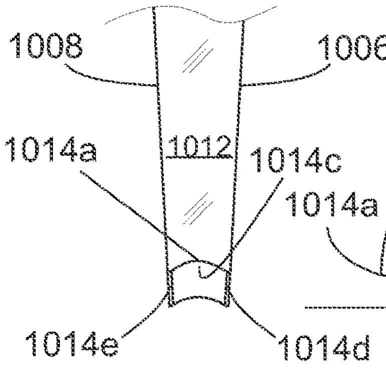
FIGS. 23*b*-23*f* present respective front, left, right, bottom, rear side views of the concave bottom chipping hammer bit introduced in FIG. 23*a;*
Figure 23B:
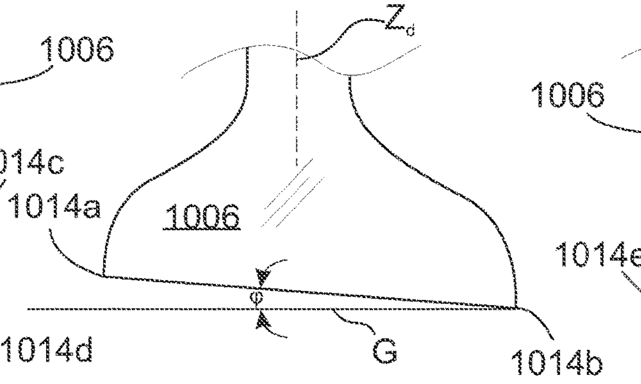
Figure 23D:
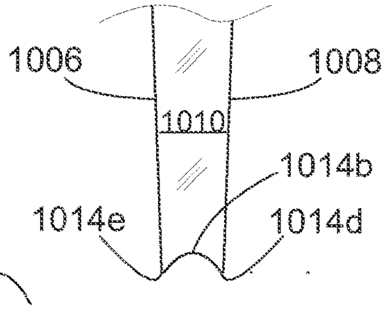
Figure 23E:
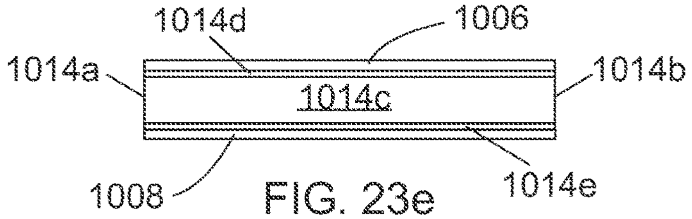
Figure 23F:
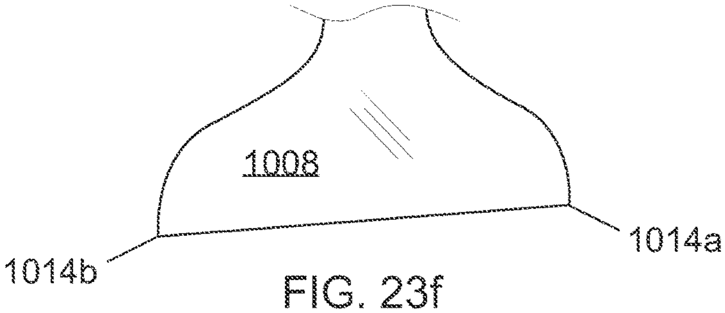
Figure 24A:
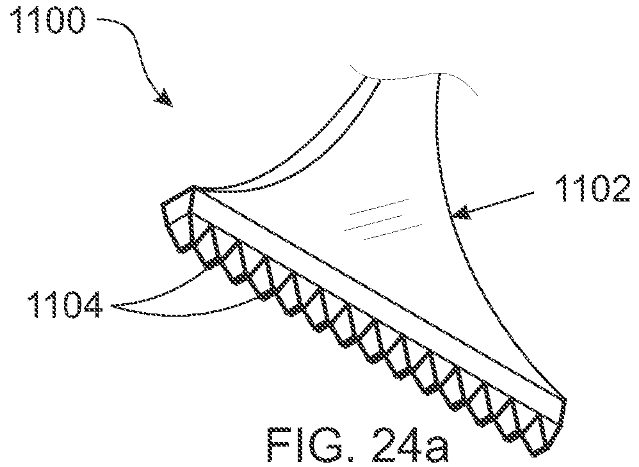
FIG. 24*a* present a front-bottom-left side perspective view of a concrete surface texturing chipping hammer bit, for use in accordance with the method of the present invention.
Figure 24C:
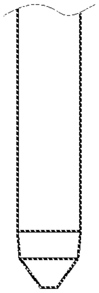
FIGS. 24*b*-24*f* present respective front, left, right, bottom, and rear side views of the concrete surface texturing chipping hammer bit introduced in FIG. 24*a.*
Figure 24B:
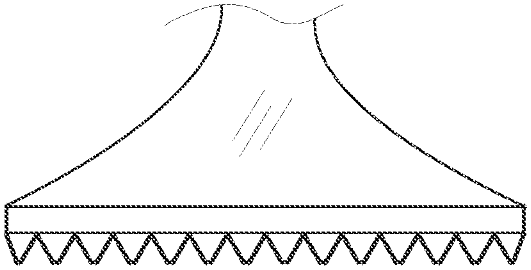
Figure 24D:
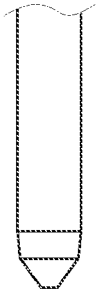
Figure 24E:
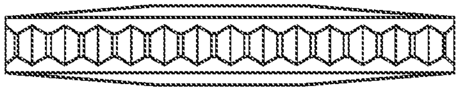
Figure 24F:
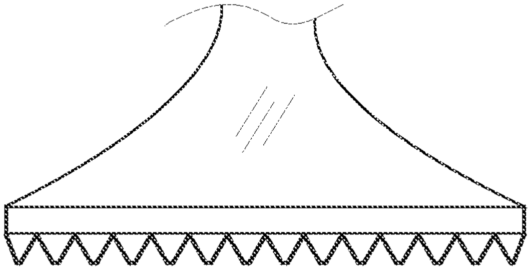

As best shown in FIG. 23*e*, bottom 1014 has a symmetric linear lateral profile extending between opposite bottom left end 1014*a* and bottom right end 1014*b*. In other words, bottom 1014 has a uniform width, laterally, between front face 1006 and rear face 1008. Furthermore, the length of right lateral side 1010 is greater, or longer, than the corresponding length of left lateral side 1012, such that right end 1014*b* (alternative referred to as leading edge 1014*b*) of bottom 1014 is farther from the ground (G) than left end 1014*a* (alternatively referred to as trailing end 1014*a*) when the central axis ($Z_d$) of shank 1002 is oriented perpendicular to the ground (G). The angle (φ) between the ground (G) and bottom 1014 is greater than 0° and has a maximum of 45°(i.e., $0° < \varphi \leq 45°$). Preferably, the angle (φ) between ground (G) and bottom 1014 falls within a range of 15° to 30°(i.e., $15° \leq \varphi \leq 30°$). Furthermore, as best shown in FIGS. 23*c*-19*d*, bottom 1014 has a concave profile extending between front face 1006 and rear face 1008. Accordingly, bottom 1014 is further defined by concave bottom surface 1014*c* adjoining opposite front bottom edge 1014*d* and rear bottom edge 1014*e*. The width of non-tapered, concave bottom 1014 (i.e., extending between the front and rear faces, 1006 and 1008) is fixed laterally across the blade body 1004.

As noted above, the profile of blade body 1004—and particularly the profile of bottom 1014—enables an operator of a chipping hammer (not shown)—carrying the cutting bit 1000—to selectively and controllably modify an existing cut (e.g., a V-shaped cut created during a prior step of the process using, for example, the variable width, tapered flat cutting or crack widening bit 700 shown in FIGS. 20*a*-20*f*). Alternatively, cutting bit 1000 may be used to modify an existing concrete surface crack, joint, or other surface imperfection. In particular, an operator directs the travel of cutting bit 1000 along a length of an existing non-square concrete surface cut (e.g., a previously created V-shaped cut/groove, or an existing crack, etc.) in the direction of leading edge 1014*b*. As the cutting bit 1000 travels it modifies the existing non-square profile (e.g., V-shaped cut, crack, etc.) into a square groove cut having flat, vertical sidewalls (e.g., in alternative implementations of bit 1000 having vertical, parallel front and rear surfaces, 1006 and 1008)—or nearly vertical sidewalls (i.e., having a taper of less than 15°). As will be apparent to those skilled in the art, the resulting square groove cut may incorporate slightly tapered sides corresponding to the inward taper of front and rear faces, 1006 and 1008, shown in the exemplary implementation in FIGS. 23*a*-23*f*). Significantly, in doing so, the bottom edges, 1014*d* and 1014*e*, together, urge the excised concrete debris inwardly such that the excised debris remains within the newly-cut square groove to facilitate its subsequent removal. Concave bottom cutting bit 1000 is used to modify an existing V-shaped straight edge cut created in the concrete surface during a prior step of the process, or an existing crack, joint or concrete surface imperfection. Significantly, the concave surface 1014*c* of bottom 1014 defines an interior space for chipped concrete to fall into for efficient removal during a subsequent step of the process.

Referring now particularly to FIGS. 24*a*-24*f*, an exemplary surface texturing, or surface roughening, bit is shown for use in connection with the method of the present invention. Referring briefly to FIG. 8, surface texturing/roughening bit 1100, alternatively referred to as "rake bit 1000," is particularly designed to impart a textured, or roughened, surface upon the discrete surface areas 64*a*, 64*b* defined by the faux grout lines 65 created in the concrete surface 12*a*. Rake bit 1100 may include a blade body 1104 at the working end of a shank 1102, wherein a bottom 1114 is provided in the form of a plurality of surface texturing features 1114*a* for imparting a desired texture upon areas of a concrete surface being modified. In addition to aesthetically enhancing the concrete surface, the surface texturing may also provide a safety benefit by imparting a high friction surface preventing individuals from slipping upon the concrete surface, for example, when the surface is wet.

Various implementations of the inventive method may be employed to efficiently and cost effectively modify a plain concrete surface or a concrete surface, integrating existing cracks, joints and other visibly unappealing surface imperfections and features into an aesthetically appealing concrete surface closely mimicking much more complex and expensive concrete surface finishes (e.g., natural stone surfaces on driveways, walkways, patios, etc.). Significantly, in the latter instance the existing cracks, joints, etc. may be effectively integrated into the final grout line pattern. Accordingly, applicant's process enables business owners and homeowners to utilize a concrete surface with existing cracks, joints, etc., without requiring pouring of new concrete, to create an aesthetically pleasing concrete surface (e.g., closely resembling a natural rock surface), wherein the process is highly efficient (i.e., typically requiring less than 24 hours to complete) and very cost effective (i.e., a fraction of the cost of most conventional concrete surface upgrades).

Furthermore, variations of the method(s) of the present invention are possible without departing from the intended scope of the invention. For example, in at least some implementations, a concrete slab may be initially poured and then intentionally allowed to crack. In that particular instance, the method may incorporate a step of introducing a material, such as sand, stone, metal or the like, into the concrete slab in order to encourage formation of cracks in a particular pattern and/or at particular locations along the surface of the concrete slab. Furthermore, a control joint may be intentionally created during an initial concrete pour. In this case, the control joint would be integrated with other cracks, etc., such that it becomes part of the intended desired pattern.

It will also be understood by those skilled in the art that the method of the present invention may be employed to work with existing topcoat materials on the upper surface of the concrete. In some instances, all or some existing paint, staining or other markings, may be removed. In other instances, all or some existing paint, staining or other markings, may be left on the surface such that they are integrated into the final treated surface. Moreover, the method of the present invention may employ additional steps of applying a topcoat material (e.g., so-called spray deck, cool deck, knockdown, etc.) over the surface following treatment. Significantly, the present method may be employed to carve, or otherwise cut, into the topcoat material. Accordingly, if the topcoat material cracks the present method may be employed to integrate the crack(s) into the original surface design.

It will also be understood by those skilled in the art that the method of the present invention is intended to cover situations where it is necessary to excavate an area covered by an existing concrete slab (e.g., to gain access to underground piping, utilities, sewage, etc.). In that case, the method may incorporate steps of removing at least some of an existing slab, re-pouring concrete, and then integrating the re-poured concrete area with an existing surrounding area to create a uniform, seamless look (i.e., wherein the newly poured concrete area has the aesthetic appearance of having been intended to be there).

It will also be understood that the method of the present invention lends itself to the purposeful future introduction of post-process cracks into an existing pattern. So, for example, where there was a single stone shape, if it cracks the method lends itself to future segmentation of the original single stone shape into two or more stone shapes. Likewise, the present invention has the benefit of enabling the integration of both existing and post-processing visible impurities, markings, stains and the like, into the surface.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method for creating a desired pattern in an exterior surface of a concrete body using a conventional chipping hammer, comprising steps of:

imparting a line design in the form of a series of temporary marking line segments upon the exterior surface of the concrete body;

providing a plurality of chipping hammer bits each having a blade body at a distal end of a shank, and securing an attachment end of the shank of a selected one of the plurality of chipping hammer bits to a working end of the conventional chipping hammer, wherein the blade body of the selected one of the plurality of chipping hammer bits terminates at a bottom edge having a bottom edge length;

resting the bottom edge of the blade body of the selected one of the plurality of chipping hammer bits upon the exterior surface of the concrete body such that the bottom edge length of the bottom edge of the selected one of the plurality of chipping hammer bits is disposed upon, and aligned with, a selected one of the series of temporary marking line segments of the line design; and manually manipulating the conventional chipping hammer, via a chipping hammer handle, to effect movement of the bottom edge of the blade body of the selected one of the plurality of chipping hammer bits along the selected one of the series of temporary marking line segments, thereby excising concrete from the exterior surface of the concrete body along the selected one of the series of temporary marking line segments to create a groove there along, wherein an operator of the conventional chipping hammer selectively varies the width of the created groove and/or the roughness of an upper edge of the created groove by manually tilting the conventional chipping hammer vertically and/or laterally to thereby vary the angle of the blade body with respect to the exterior surface of the concrete body, while simultaneously moving the bottom edge of the selected one of the plurality of chipping hammer bits along the selected one of the series of temporary marking line segments.

2. The method recited in claim 1, wherein the exterior surface of the concrete body includes a surface crack length therein, the method further comprising steps of:

integrating the surface crack length into the series of temporary marking line segments of the line design to form a contiguous line pattern comprised of the series of temporary marking line segments and the surface crack length; and creating a groove along an upper portion of the surface crack length, contiguous with the groove created along the selected one of the series of temporary marking line segments.

3. The method recited in claim 2, wherein the selected one of the plurality of chipping hammer bits comprises a mortar joint impression chipping hammer bit.

4. The method recited in claim 3, wherein the mortar joint impression chipping hammer bit further comprises a convex mortar joint impression chipping hammer bit having a tapered blade thickness for enabling the operator of the conventional chipping hammer to controllably vary the respective width of a mortar joint impression being imparted in the concrete body surface.

5. The method recited in claim 3, wherein the mortar joint impression chipping hammer bit further comprises a raised, straight-edged, uniform width mortar joint impression portion projecting downwardly from the bottom edge of the blade body.

6. The method recited in claim 3, wherein the mortar joint impression chipping hammer bit further comprises a convex, blunt nose mortar joint impression bit having a raised, concave, variable width impression portion extending outwardly from the bottom edge of the blade body.

7. The method recited in claim 3, wherein the mortar joint impression chipping hammer bit further comprises a vertically-angled, tapered blade body thickness for enabling the operator of the conventional chipping hammer to controllably vary the respective width of a mortar joint impression being imparted in the exterior surface of the concrete body along the surface crack length.

8. The method recited in claim 3, wherein the mortar joint impression chipping hammer bit further comprises a dual-function, angled, inwardly tapered, variable width, flat bottom chipping hammer bit capable of imparting a mortar joint impression in the exterior surface of the concrete body, and further capable of widening the surface crack length.

9. The method recited in claim 3, wherein the mortar joint impression chipping hammer bit further comprises an adjustable/variable width, bi-directional chipping hammer bit.

10. The method recited in claim 2, wherein the selected one of the plurality of chipping hammer bits further comprises a radial tip chipping hammer bit.

11. The method recited in claim 2, wherein the selected one of the plurality of chipping hammer bits further comprises a multi-rock intersection edge removal chipping hammer bit.

12. The method recited in claim 2, wherein the selected one of the plurality of chipping hammer bits further comprises an angled, inwardly tapered, concave bottom chipping hammer bit for creating formal, jagged, straight edged geometric shapes imparting a natural slate stone look in the exterior surface of the concrete body.

* * * * *